US012353380B2

(12) United States Patent
Dean

(10) Patent No.: US 12,353,380 B2
(45) Date of Patent: Jul. 8, 2025

(54) MEASUREMENT OF DEVICE USAGE VIA THE USE OF AN ACCESSIBILITY API AND CONFIGURABLE RULES ENGINE

(71) Applicant: RealityMine Limited, Manchester (GB)

(72) Inventor: Graham Nigel Dean, Cheshire (GB)

(73) Assignee: REALITYMINE LIMITED, Manchester (GB)

( * ) Notice: Subject to any disclaimer, the term of this patent is extended or adjusted under 35 U.S.C. 154(b) by 283 days.

(21) Appl. No.: 18/079,600

(22) Filed: Dec. 12, 2022

(65) Prior Publication Data

US 2023/0185909 A1 Jun. 15, 2023

Related U.S. Application Data

(60) Provisional application No. 63/288,792, filed on Dec. 13, 2021.

(51) Int. Cl.
*G06F 16/22* (2019.01)
*G06F 3/01* (2006.01)
(Continued)

(52) U.S. Cl.
CPC .............. *G06F 16/22* (2019.01); *G06F 3/016* (2013.01); *G06F 8/20* (2013.01); *G06F 9/451* (2018.02);
(Continued)

(58) Field of Classification Search
CPC .... G06F 16/22; G06F 16/24568; G06F 3/016; G06F 3/04886; G06F 16/2477;
(Continued)

(56) References Cited

U.S. PATENT DOCUMENTS 10,985,970 B1 * 4/2021 Goyal ................. G06F 16/2477
2007/0219941 A1 9/2007 Schnurr et al.
(Continued)

FOREIGN PATENT DOCUMENTS

CN 101512503 B * 3/2013 ............... G06F 8/20
WO WO-2020093164 A1 * 5/2020 ........... G06V 10/764

OTHER PUBLICATIONS

PCT Search Report, Mar. 31, 2023, International Bureau of WIPO.
(Continued)

*Primary Examiner* — Kyung H Shin

(74) *Attorney, Agent, or Firm* — Carter, Ledyard & Milburn, LLP

(57) ABSTRACT

A user interface change event is detected. An app identifier of an associated third party app is determined. A dynamic rule data structure associated with the app identifier of the associated third party app is determined. A user interface match state specified by the dynamic rule data structure is determined based on absolute screen positioning or relative screen positioning. A current user interface state of the associated third party app is determined by querying an accessibility API. Upon determining that the user interface match state matches the current user interface state, at least one user interface report field specified by the dynamic rule data structure is determined and at least one report field property of the at least one user interface report field is
(Continued)

EXEMPLARY DUME DATA FLOW extracted by querying the accessibility API. An active session data structure associated with the dynamic rule data structure is updated to store the extracted property value.

42 Claims, 12 Drawing Sheets

(51) Int. Cl.
| | |
|---|---|
| *G06F 8/20* | (2018.01) |
| *G06F 9/451* | (2018.01) |
| *G06F 16/2458* | (2019.01) |
| *G06F 21/55* | (2013.01) |
| *G06F 21/64* | (2013.01) |
| *G06V 10/764* | (2022.01) |
| *G11B 27/34* | (2006.01) |
| *H04N 5/76* | (2006.01) |

(52) U.S. Cl.
CPC ........ *G06F 16/2477* (2019.01); *G06F 21/554* (2013.01); *G06F 21/645* (2013.01); *G06V 10/764* (2022.01); *G11B 27/34* (2013.01); *H04N 5/76* (2013.01); *G06F 2221/034* (2013.01)

(58) Field of Classification Search
CPC . G06F 16/2465; H04L 65/60; H04L 41/0631; G11B 27/3081; G11B 27/34; G06V 20/47; G06V 20/52; G06V 10/764; G06V 20/40; G08B 17/125
See application file for complete search history.

(56) References Cited

U.S. PATENT DOCUMENTS

| | | | |
|---|---|---|---|
| 2010/0162109 A1* | 6/2010 | Chatterjee | ............... G06F 3/016 |
| | | | 715/702 |
| 2018/0329591 A1 | 11/2018 | Gunther | |
| 2019/0294598 A1* | 9/2019 | Hsiao | ...................... G06F 16/22 |

OTHER PUBLICATIONS

Anonymous, "UI Automation and Microsoft Active Accessibility", Sep. 15, 2021, https://learn.microsoft.com/en-us/dotnet/framework/ui-automation/ui-automation-and-microsoft-active-accessibility.
Alexander, Jason et al., "AppMonitor: A tool for recording user actions in unmodified Windows applications", Behavior Research Methods, May 1, 2008, vol. 40, No. 2 , pp. 413-421, USA.

* cited by examiner

EXEMPLARY DUME ARCHITECTURE

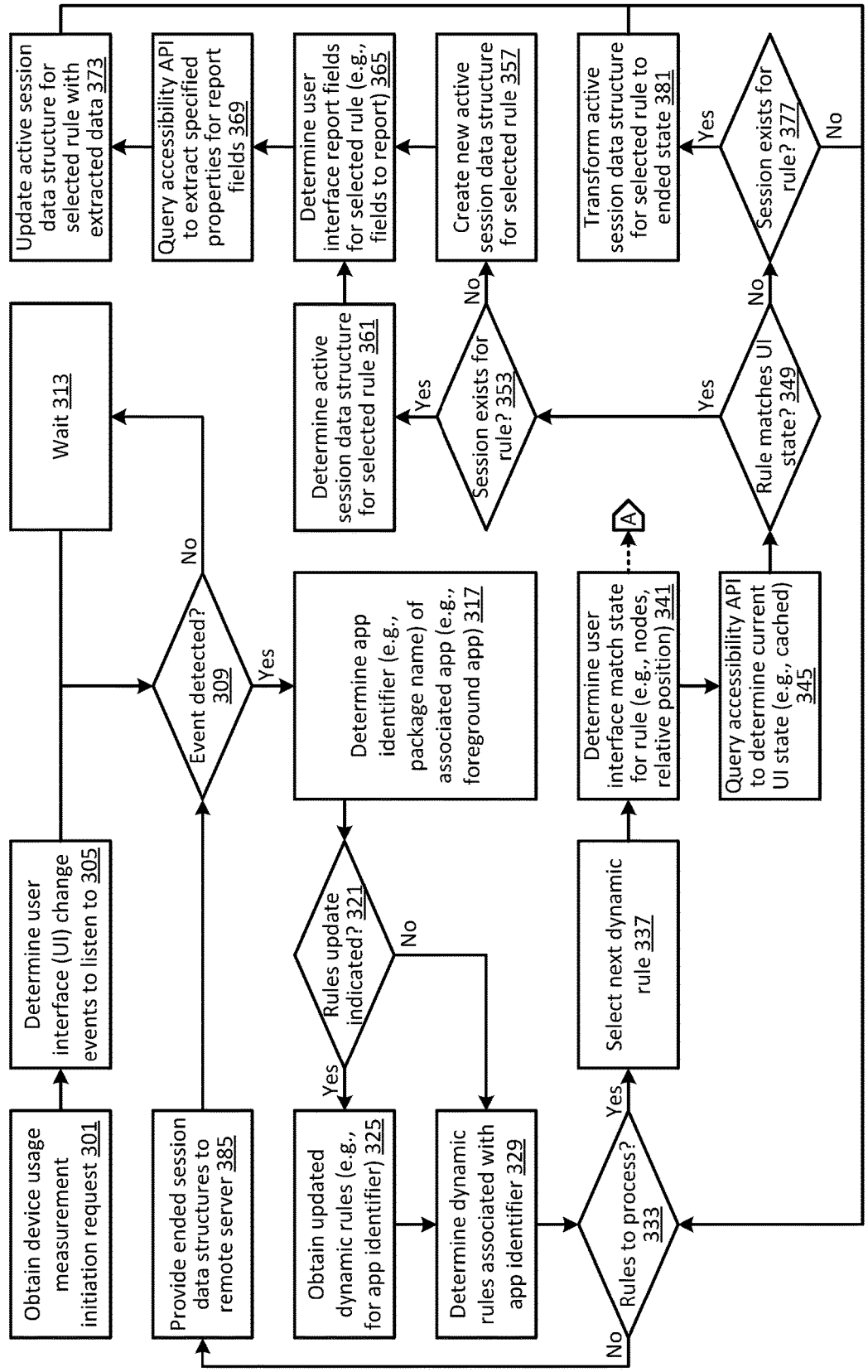

FIGURE 4C

| Property | Value |
|---|---|
| level | 8 |
| text | S1:E1 "Out of the Deep Woods" |
| contentDescription | |
| className | android.widget.TextView |
| viewId | com.netflix.mediaclient:id/player_title_label |
| isVisible | true |
| isEnabled | true |
| isSelected | false |
| isChecked | false |
| isCheckable | false |
| isFocused | false |
| isFocusable | false |
| isAccessibilityFocused | false |
| isClickable | false |
| isLongClickable | false |
| isPassword | false |
| isScrollable | false |
| isEditable | false |
| paneTitle | |
| drawingOrder | 9 |
| isContentInvalid | false |
| isContextClickable | false |
| liveRegion | 0 |
| isMultiLine | false |
| canOpenPopup | false |
| isDismissable | false |
| isImportantForAccessibility | true |
| isScreenReaderFocusable | false |
| isShowingHintText | false |
| isHeading | false |
| isTextEntryKey | false |
| hintText | |
| error | |
| stateDescription | |
| tooltipText | |
| packageName | com.netflix.mediaclient |
| bounds | [147,48][2133,99] |

EXEMPLARY DUME SCREENSHOT

FIGURE 5

EXEMPLARY DUME DATA STRUCTURE

```
"name": "Netflix media playing", 505
"packageName": "com.netflix.mediaclient",
"requiredNodes": {
    "nodeIds": {
        521 "viewId": "com.netflix.mediaclient:id/playback_surface"
        },
        {
        523 "viewId": "com.netflix.mediaclient:id/player_controls_primary"
        }
    }
},
"fieldsToReport": {
    531 "fieldName": "title",
    533 "nodes": {
        {
        535 "viewId": "com.netflix.mediaclient:id/player_title_label"
        },
        537 "propertyToReport": "TEXT"
    }
}
```

501 — The packageName ensures the rule only evaluates for a given app

510 — Required nodes list the user interface elements that must be present for the rule to match.

520 — Here there is one combination of "nodeIds" that define two different user interface elements must be present, where the second element is a descendant of the first 530 — fieldsToReport lists data that is to be extracted from user interface elements, for when the rule matches. Here, the TEXT property is extracted from a user interface element with a specific view ID

FIGURE 6

EXEMPLARY DUME DATA STRUCTURE

601 — 
610 — This indicates the name of the rule that was matched to create the session 620 — The start and end times indicate the period over which the rule matched i.e. where requiredNodes are found 630 — Extracted fields are populated for fieldsToReport that match. Extracted fields are persisted for the duration of the session even though they may only match for part of the session duration.

The "value" property here corresponds to the "propertyToReport" within the rule i.e. in this case, the TEXT property is being reported.

```
"ruleName": "Netflix media playing",
"startTime": "2021-12-09T17:05:23.983Z",
"endTime": "2021-12-09T17:28:27.142Z",
"extractedFields": [
  {
    631 "fieldName": "title",
    "values": [
      {
        633 "value": "S1:E1 \"Out of the Deep Woods\"",
        "index": 0,
        "isFocussed": false,
        "isEnabled": true,
        "isSelected": false,
        "isVisible": true
```

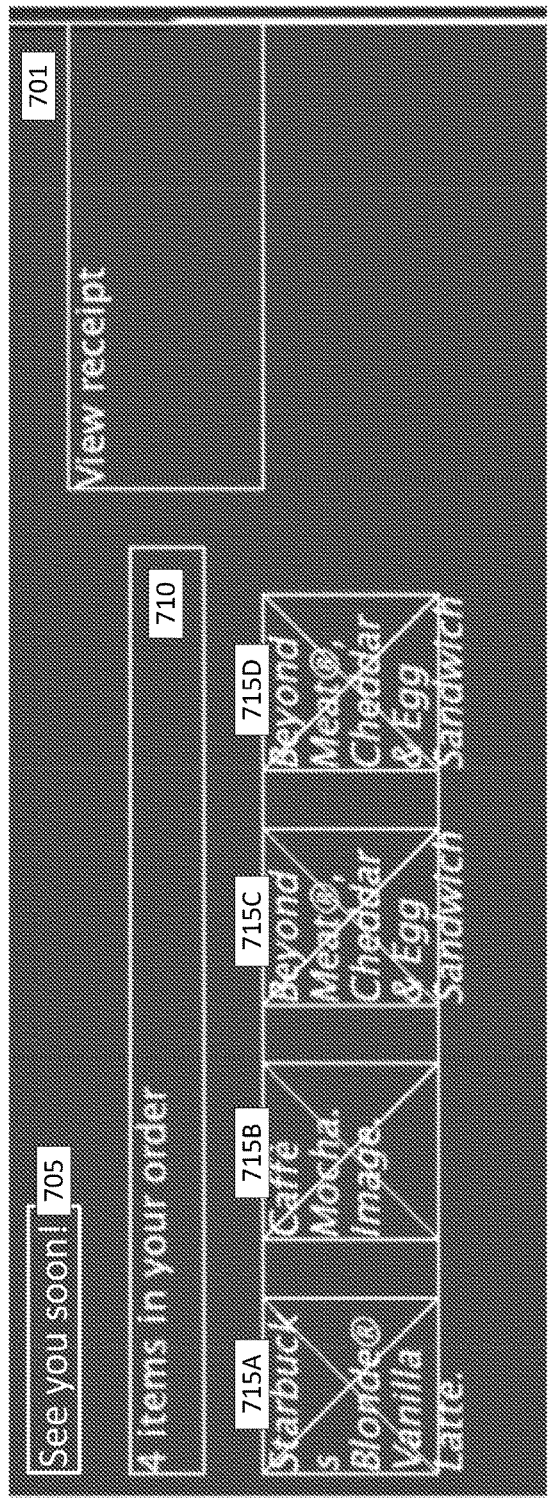
FIGURE 7 — EXEMPLARY DUME SCREENSHOT

EXEMPLARY DUME COORDINATOR

MEASUREMENT OF DEVICE USAGE VIA THE USE OF AN ACCESSIBILITY API AND CONFIGURABLE RULES ENGINE

CROSS-REFERENCE TO RELATED APPLICATIONS

Applicant hereby claims priority under 35 U. S. C. § 119 to U.S. provisional patent application No. 63/288,830, filed Dec. 13, 2021, entitled "MEASUREMENT OF DEVICE USAGE VIA THE USE OF AN ACCESSIBILITY API AND CONFIGURABLE RULES ENGINE."

The entire contents of the aforementioned applications are herein expressly incorporated by reference in their entirety.

This disclosure describes DEVICE USAGE MEASUREMENT ENGINE APPARATUSES, METHODS, SYSTEMS AND MEDIA (hereinafter "DUME"). A portion of the disclosure of this patent document contains material which is subject to copyright and/or mask work protection. The copyright and/or mask work owners have no objection to the facsimile reproduction by anyone of the patent document or the patent disclosure, as it appears in the Patent and Trademark Office patent file or records, but otherwise reserve all copyright and mask work rights whatsoever.

FIELD

The present disclosure is directed generally to apparatuses, methods, systems and media to use an accessibility API to read user interface elements from apps or websites where the rules for how data are extracted and from which user interface elements depend on a set of dynamic rules that can be updated over a network and where the rules, at least in part, depend on the screen position of user interface elements.

BACKGROUND

Measuring digital activity of users on digital devices such as smartphones or personal computers (e.g., when undertaken by individuals who opt-in to being measured via a panel) can form the source data used for research (e.g., to inform research agencies and other organizations on trends and insights into digital behaviours).

Examples of digital activity that are useful to measure include but are not limited to apps used by the user, web pages visited in a browser, adverts exposed to the user, video content viewed by the user, audio content listened to, and/or shopping behaviour including purchases, searches and add-to-cart events.

BRIEF DESCRIPTION OF THE FIGURES

The accompanying figures and/or appendices illustrate various exemplary embodiments in accordance with the present disclosure.

FIGS. 3A-B show a logic flow diagram illustrating a device usage measuring (DUM) component in one embodiment of the DUME;

FIGS. 4A-C show screenshot diagram(s) in one embodiment of the DUME;

FIG. 5 shows data structure(s) in one embodiment of the DUME;

FIG. 6 shows data structure(s) in one embodiment of the DUME;

FIG. 7 shows screenshot diagram(s) in one embodiment of the DUME;

DETAILED DESCRIPTION

Description of the Related Art

Figure 1:
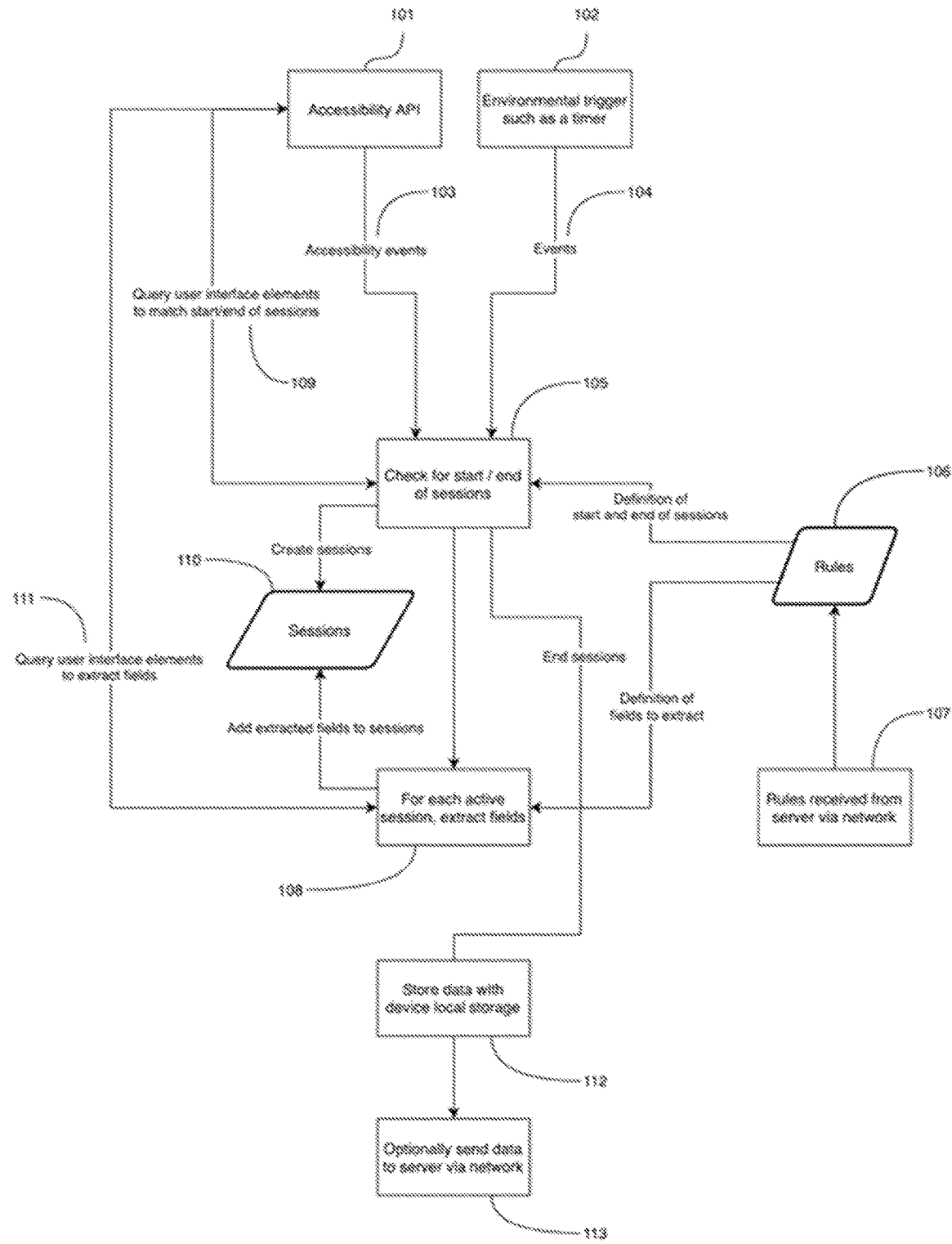
FIG. 1 shows an exemplary architecture in one embodiment of the DUME.

Limited digital usage data may exist within specific digital ecosystems, for example social networks, or search engines. However, these data are limited to what can be collected from within these specific apps and websites and generally do not have visibility beyond the bounds of that ecosystem. The data are also usually closely guarded by the owning organization. They are often referred to as "walled gardens" for this reason.

An approach to measuring the activity across all apps and websites on a given device is to monitor the network traffic from the device. This however has limitations that much of the traffic from the device is encrypted with limited scope to be decrypted by a third party, leading to limited usage information that can be inferred from the network traffic. Generally, detailed activity such as specific web pages visited, specific advertisements exposure, and/or specific video content viewed, is not possible using this approach.

Accessibility APIs, also called automation APIs, herein simply referred to as "Accessibility APIs" exist within operating systems, such as Android and Windows, primarily to allow the development of apps that assist users with disabilities, or who may temporarily be unable to fully interact with a device. In order to measure the activity across a wide variety of apps and websites, an accessibility API can be used to read the text contents of the user interface. This approach allows a third-party app to inspect the user interface of other apps, including web browsers where the web page content may also be available. In general, any text visible on the screen to the user may be made available via the accessibility API, as well as other hints that may not be otherwise visible and other properties such as position on screen, identifiers, type of UI element, etc. This leads to a large amount of data that is available via the accessibility API and the data is constantly changing as the user interface changes. It also means that sensitive personal data may be exposed via the accessibility API.

Various apps exist (often called passive meter apps) that use an accessibility API to measure specific behaviours on a device. These apps take an approach to only capture specific data relevant to the behaviours of interest to be measured. The method of filtering all the possible data exposed via the accessibility API into just the data required uses a hard coded filter. The parameters of the filter are coded into the executable code of the app. This has limitations in that if new behaviours are desired to be measured, a new build of the app needs to be produced and deployed to users. Additionally, changes in the apps or websites being measured may cause the filter to no longer function as desired, requiring the filter to be updated and a new app produced and deployed.

Additionally, some user activities, such as viewing videos may cause user interface elements that are useful for measuring the specific content viewed to only be visible for a subset of the time for when the video is viewed, for example, when the title of the video is only displayed for the first few seconds when the video plays. It is desirable to record the video viewing activity for the full duration while the video is playing, while associating the title and any other metadata with the entire duration. Thus, just recording when the title is visible may be insufficient to accurately report the viewing duration of a specific video.

INTRODUCTION

In order to measure specific activities on digital devices such as smartphones or personal computers via the use of an accessibility API, and to be as selective as possible to generate data structures capturing the data desired for a specific purpose, the DUME provides apparatuses, methods, systems and media for configuring a rules engine such that the desired data available via the accessibility API is captured and recorded. The rules are defined dynamically and can be received and updated over a network.

The rules define how to identify specific user activity via matching specific user interface elements and when found, a session may be created via an active session data structure. While a session is active, a set of data fields may be extracted from specific user interface elements. The rules contain a definition of these data fields and how the values should be extracted from the user interface elements. The execution of the rules logic may be triggered by any combination of: an event from an accessibility API, a timer, or some other source. In one embodiment, by separating the definition of when a session should start and end from the fields that are reported, the problem of where a field, such as a video title, is only visible for a subset of the whole session is overcome. The rules engine may persist any fields for the entire duration of the session, even if a field is only accessible for a portion of the time.

Various properties and relationships may exist within the user interface elements, as exposed via the accessibility API, and the rules support a plurality of methods for identifying the user interface elements of interest. For example, the rules may look for elements that contain specific text patterns, have specific IDs, have specific classes of controls (e.g., buttons, text labels, text edit boxes), and/or the like. The rules may also use hierarchical relationships between the user interface elements, for example, looking for children, descendants, siblings, parents or ancestors of other elements and traversing the hierarchy of user interface elements using relative relationships. These relative relationships may use indexing to further navigate the relationships, for example, to find the second and third child of another element. Additionally, the position and size of the user interface element on the screen may be taken into account, and this position information may be used in a relative sense, such as to find a user interface element "to the right" of another element, or may be used in an absolute sense, such as to find a user interface element within the top quarter of the screen with aspect of at least 4 to 1 width to height ratio.

Once one or more user interface elements are found by the rules engine, the specific data extracted from those elements may also be defined within the rules. Example properties from which to extract data include: the visible text, content description, hint text, flags such as whether the item is selected, checked, focused, etc., or the screen position of the element.

All these methods to filter and navigate the user interface element hierarchy can be combined in an arbitrary manner to form a flexible and powerful language to tightly define the specific user interface elements and data to extract. This level of flexibility is important because when measuring apps and websites that are not within the control of the measuring app, the user interface elements may not always be conveniently labeled, and any properties may change from version to version of the app or website being measured. By being able to define rules that combine these properties, including using the position and size of user interface elements, rules can be developed that are resilient to (e.g., minor) changes to the user interface of the app or website being measured, or new rules can be deployed over the network to rapidly respond to changes.

Detailed Description of the DUME

FIG. 1 shows an exemplary architecture in one embodiment of the DUME. In one embodiment, the DUME may be implemented inside an app, service, driver, component process, and/or the like, herein referred to as "the app", running on an operating system of a user's device. In one implementation, the app may obtain permission to have, at least, read-only access to the accessibility API 101 of the operating system. Obtaining such permission may include prompting the user to perform some steps to grant the app the access desired, such as changing some settings within the operating system, accepting permission prompts, entering a password, and/or the like.

In one implementation, the app may manage a collection of rules in the memory of the device. In one implementation, a rule may contain a definition of what user interface elements should be present in order for a session to be created. When these user interface elements are no longer present, the session is ended. A rule may also contain a definition of fields that are to be extracted from the user interface within the period of the session. The collection of rules may be updated via receiving a new rule set via the network 107. The rule collection, when received via the network, may be defined in a structured format, such as JSON, and parsed by the app into an in-memory structure.

In one implementation, once permission has been granted for reading from the accessibility API 101, the app enters a state where it is listening for events, which may be a combination of accessibility events 103, timer events, window events, input events such as mouse or keyboard events, or other system events 104. The aim here is to respond to any events that may indicate a change in the user interface such that the accessibility API can be queried for potential changes in the user interface at suitable intervals. By responding to events that may indicate a change to the user interface (e.g., event types other than timer events), the number of queries can be minimized, which helps minimize the impact the app may have on the utilization of resources of the device running the operating system, such as CPU and power. It may however, also be useful to respond to timer events (e.g., at a reduced frequency) to cover the eventuality that the user interface changes, and other event types are not received in a timely manner.

In one implementation, in response to any of the events, the system may enumerate the rules held in memory 106. For each rule held, the rule may be checked whether it matches the current state of the user interface as exposed via the accessibility API 109. In one implementation, this involves checking the following criteria in order: Does the foreground application as exposed via the accessibility API match that within the rule? Are the desired user interface elements defined within the rule found within the current state of the user interface? The foreground app may be checked first because if there is no match then the rule does not match and the other criteria do not need to be evaluated, saving the time and resources required to further query the user interface. If the foreground app matches the rules, then the desired user interface elements defined in the rule may be queried for via the accessibility API.

As mentioned above, the rules may look for elements that contain specific text patterns, have specific IDs, have specific classes of controls (e.g., buttons, text labels, text edit boxes), and/or the like. The rules may also use hierarchical relationships between the user interface elements, for example, looking for children, descendants, siblings, parents or ancestors of other elements and traversing the hierarchy of user interface elements using relative relationships. These relative relationships may use indexing to further navigate the relationships, for example, to find the second and third child of another element. Additionally, the position and size of the user interface element on the screen may be taken into account, and this position information may be used in a relative sense, such as to find a user interface element "to the right" of another element, or may be used in an absolute sense, such as to find a user interface element within the top quarter of the screen with aspect of at least 4 to 1 width to height ratio.

In one implementation, once the desired user interface elements are found for a rule, a session may be created via an active session data structure and stored within the memory of the device 110. A collection of session data structures may be maintained by the app and each session data structure may include data fields such as: start time, end time (e.g., populated once the session has ended), reference to the rule that triggered the session, and any fields extracted within the active period of the session.

In one implementation, once the rules have been enumerated, the collection of sessions that have not ended (e.g., the set of active session data structures) may be enumerated 108. For each of these active session data structures, the user interface may be queried based on a definition of fields to extract specified within the rule associated with each respective session 111. In one implementation, the definition of fields to extract may be defined in a similar language and/or structure to the definition of what user interface elements should be present to start a rule. However, in addition to defining which user interface elements are being searched for, the definition may also contain a reference to at least one property to extract for the field that is reported into the respective active session data structure. Example properties from which to extract data may include: the visible text, content description, hint text, flags such as whether the item is selected, checked, focused, etc., or the screen position of the element. When a field is extracted from the user interface, it is added to the respective active session data structure within the session collection 110.

In one implementation, a session is ended if the user interface elements utilized to start the session are no longer present. Once a session has ended, the end time field may be populated within a corresponding active session data structure, which is then transformed to the ended state (e.g., into an ended session data structure), and the ended session data structure may be stored within the local storage of the device 112 (e.g., separately from the active session data structures). The collection of ended session data structures may also be sent over a network to a remote server 113 and, once successfully sent, may be removed from the device (e.g., to utilize the local storage of the device more efficiently).

Figure 2:
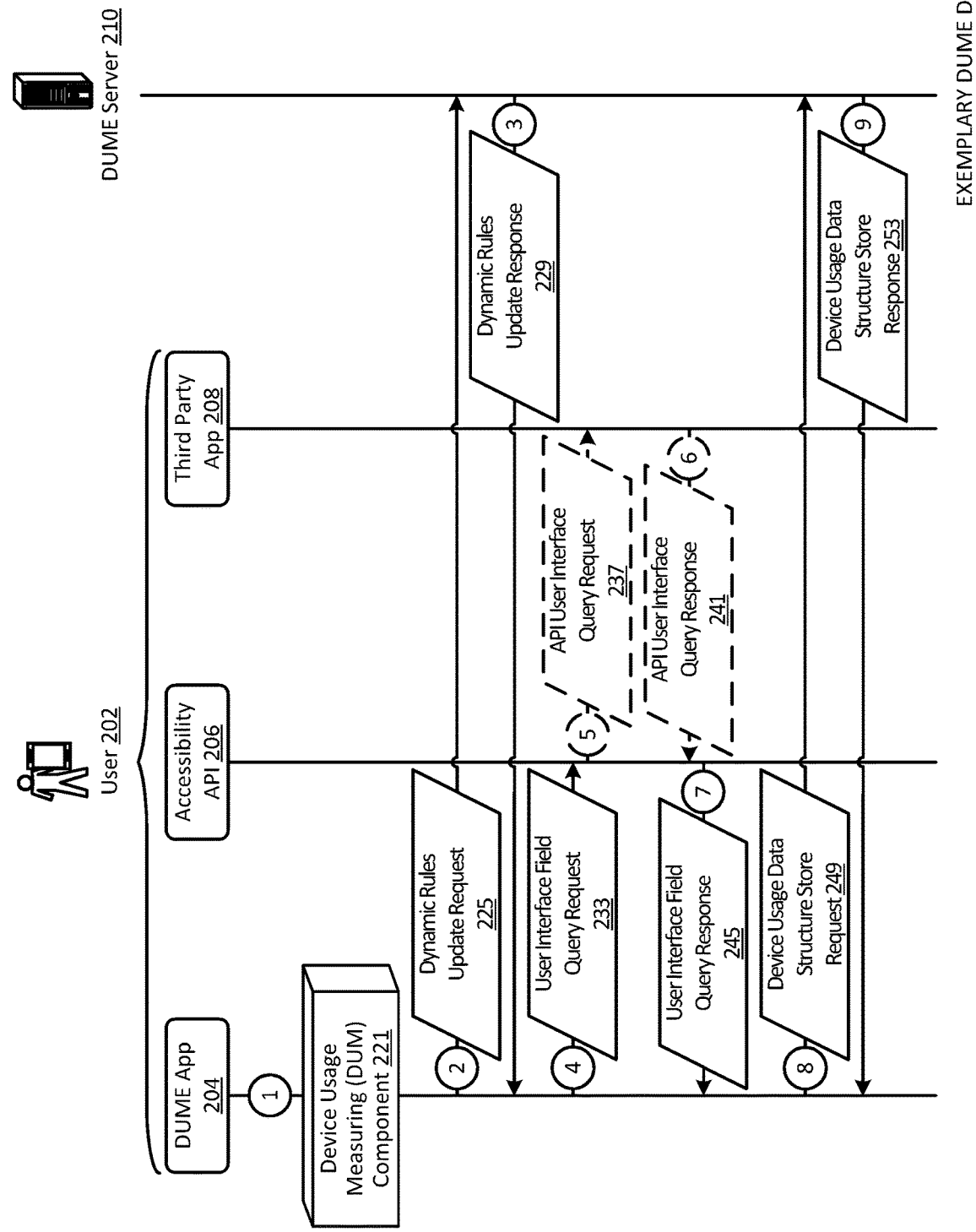
FIG. 2 shows a data flow diagram in one embodiment of the DUME.

FIG. 2 shows a data flow diagram in one embodiment of the DUME. In FIG. 2, dashed lines indicate data flow elements that may be more likely to be optional. FIG. 2 provides an example of how data may flow to, through, and/or from the DUME. In FIG. 2, a user 202 may use a client (e.g., a desktop, a laptop, a tablet, a smartphone, a smartwatch) to access a third party app 208 (e.g., a website, application (e.g., a desktop application, a mobile app)). In one embodiment, the client's operating system may include an accessibility API 206 (e.g., a service, a component) that may be configured to be accessible (e.g., via permission settings) by a DUME app 204 (e.g., an application (e.g., a desktop application, a mobile app), service, driver, component process) that implements device usage measuring.

A device usage measuring (DUM) component 221 of the device usage measuring DUME app 204 may listen for events (e.g., a combination of accessibility events, timer events, window events, input events such as mouse or keyboard events, or other system events) to generate session data structures that store device usage measurement information using dynamic rules. See FIGS. 3A-B for additional details regarding the DUM component.

The DUME app 204 may send a dynamic rules update request 225 to a DUME server 210 to facilitate obtaining updated dynamic rules. In one implementation, the dynamic rules update request may include data such as a request identifier, a request type, client details, third party app details, and/or the like. For example, the dynamic rules update request may be sent via a network in XML format substantially in the following form:

```
<?XML version = "1.0" encoding = "UTF-8"?>
<dynamic_rules_update_request>
   <request_identifier>ID_request_1</request_identifier>
   <request_type>UPDATE_RULES</request_type>
   <client_details>
      <client_identifier>ID_client_1 (e.g., user's
      UUID)</client_identifier>
      <client_type>Google Pixel 6</client_type>
      <client_IP_address>XXX.XXX.XXX.XXX</client_IP_address>
      <client_OS>Android 12</client_OS>
      <client_web_browser>Google Chrome</client_web_browser>
   </client_details>
   <third_party_app_details>
      <app_identifier>Package name:
      com.netflix.mediaclient</app_identifier>
      <app_version>8.7.0</app_version>
   </third_party_app_details>
</dynamic_rules_update_request>
```

The DUME server 210 may send a dynamic rules update response 229 to the DUME app 204 with the requested updated dynamic rules. In one implementation, the dynamic rules update response may include data such as a response identifier, the requested updated dynamic rules, and/or the like. For example, the dynamic rules update response may be sent via a network in XML format substantially in the following form:

```
<?XML version = "1.0" encoding = "UTF-8"?>
<dynamic_rules_update_response>
   <response_identifier>ID_response_1</response_identifier>
   <rules>
      <rules_version>128</rules_version>
      <rule>
         <name>Netflix media playing</name>
         <package_name>com.netflix.mediaclient</package_name>
         <required_nodes>
            <viewId>
               com.netflix.mediaclient:id/playback_surface
            </viewID>
            <viewId>
               com.netflix.mediaclient:id/playback_controls_primary
```

```
        </viewID>
      </required_nodes>
      <fields_to_report>
        <field_name>title</field_name>
        <nodes>
          <viewId>
            com.netflix.mediaclient:id/player_title_label
          </viewId>
        </nodes>
        <property_to_report>TEXT</property_to_report>
      </fields_to_report>
    </rule>
    <rule>...</rule>
    ...
  </rules>
</dynamic_rules_update_response>
```

The DUME app 204 may send a user interface field query request 233 to the accessibility API 206 to facilitate actions such as determining whether a rule matches the current UI state of the third party app, extracting a specified property of a UI element of the third party app, and/or the like. It is to be understood that a plurality of user interface field query requests may be sent to facilitate various actions. In one implementation, the user interface field query request may comprise one or more API calls to the accessibility API (e.g., android.accessibilityservice.AccessibilityService.getRootInActiveWindow( ), android.view.accessibility.AccessibilityNodeInfo.getViewIdResourceName( ), android.view.accessibility.AccessibilityNodeInfo.getText( )) and may include data such as a request identifier, a request type, request flags, an app identifier, a field identifier, a property identifier, and/or the like.

In one embodiment, the accessibility API 206 may utilize the user interface framework of the client's operating system to facilitate performing the requested action. In an alternative embodiment (e.g., when the third-party uses some non-standard UI elements and makes those custom UI elements accessible), the accessibility API 206 may send an API user interface query request 237 to the third party app 208 to facilitate performing the requested action. In one implementation, the API user interface query request may be specific to the accessibility API of the client's operating system (e.g., an API call to the android.view.accessibility.AccessibilityNodeProvider of the third party app).

In the alternative embodiment, in which the API user interface query request 237 is sent to the third party app 208, the third party app 208 may send an API user interface query response 241 to the accessibility API 206 with the requested data. In one implementation, the API user interface query response may be specific to the accessibility API of the client's operating system.

The accessibility API 206 may send a user interface field query response 245 to the DUME app 204 with the requested accessibility data. See FIGS. 4B and 4C for exemplary data structures that may be provided via the accessibility API. It is to be understood that a plurality of user interface field query requests and corresponding user interface field query responses may be utilized to generate such data structures (e.g., a call to android.accessibilityservice.AccessibilityService.getRootInActiveWindow( ), followed by recursively calling android.view.accessibility.AccessibilityNodeInfo.getChild( ), and for each node found, calls to get the various properties to functions such as android.view.accessibility.AccessibilityNodeInfo.getText( ), and/or the like).

The DUME app 204 may send a device usage data structure store request 249 to the DUME server 210 to facilitate storing ended session data structures on a remote server. In one implementation, the device usage data structure store request may include data such as a request identifier, a request type, client details, ended session data structures, and/or the like. For example, the device usage data structure store request may be sent via a network in XML format substantially in the following form:

```
<?XML version = "1.0" encoding = "UTF-8"?>
<device_usage_data_structure_store_request>
  <request_identifier>ID_request_4</request_identifier>
  <request_type>STORE_DEVICE_USAGE_MEASUREMENT_DATA</request_type>
  <client_details>
    <client_identifier>ID_client_1 (e.g., user's UUID)</client_identifier>
    ...
  </client_details>
  <ended_session_data_structures>
    <ended_session_data_structure>
      <session_start_time>2021-12-09T17:05:23.983Z</session_start_time>
      <session_end_time>2021-12-09T17:28:27.142Z</session_end_time>
      <rule_name>Netflix media playing</rule_name>
      <field>
        <field_name>title</field_name>
        <field_value>S1:E1 "Out of the Deep Woods"</field_value>
      </field>
    </ended_session_data_structure>
    <ended_session_data_structure>...</ended_session_data_structure>
    ...
  </ended_session_data_structures>
</device_usage_data_structure_store_request>
```

The DUME server 210 may send a device usage data structure store response 253 to the DUME app 204 to confirm that the ended session data structures have been stored successfully. In one implementation, the device usage data structure store response may include data such as a response identifier, a status, and/or the like. For example, the device usage data structure store response may be sent via a network in XML format substantially in the following form:

```
<?XML version = "1.0" encoding = "UTF-8"?>
<device_usage_data_structure_store_response>
  <response_identifier>ID_response_4</response_identifier>
  <status>OK</status>
</device_usage_data_structure_store_response>
```

FIG. 3A shows a logic flow diagram illustrating a device usage measuring (DUM) component in one embodiment of the DUME. In FIG. 3A, a device usage measurement initiation request may be obtained at 301. For example, the device usage measurement initiation request may be obtained as a result of installation and/or execution (e.g., including obtaining access to an accessibility API of a user's client) of the DUME app to facilitate device usage measuring.

User interface (UI) change events to listen to may be determined at 305. For example, the UI change events to listen to may be a combination of accessibility events, timer events, window events, input events such as mouse or keyboard events, or other system events. In one embodiment, the UI change events to listen to may include events that may indicate a change in the user interface of a third party app. In one implementation, configuration settings associated with the DUME app may specify the UI change events to listen to and/or associated configuration details (e.g., polling frequency for timer events, app identifiers of third party apps for which an event is relevant). In some implementations, configuration settings associated with the DUME app may specify a set of app identifiers of third party apps for which accessibility events should be provided by the accessibility API (e.g., to improve resource utilization of the client).

A determination may be made at 309 whether a UI change event has been detected. If not, the DUME app may wait at 313. In one implementation, the DUME app may wait until it is notified that a UI change event has been detected. In another implementation, such as for timer events, the DUME app may wait a specified period of time (e.g., 10 seconds, 5 minutes). It is to be understood that waiting may be nonblocking.

If a UI change event has been detected, an app identifier (e.g., package name, website address, uniform resource identifier (URI)) of an associated third party app (e.g., foreground app) may be determined at 317. In one implementation, the accessibility API may be queried to determine the app identifier of the associated third party app. For example, the app identifier of the associated third party app may be determined via an API call to android.view.accessibility.AccessibilityNodeInfo.getPackageName( ).

A determination may be made at 321 whether a rules update is indicated. In one implementation, dynamic rules utilized by the DUME app may be updated in response to specified events. For example, the dynamic rules may be updated periodically (e.g., daily, weekly, monthly) based on a timer event indicating that a remote server should be checked for a new version of dynamic rules. In another example, dynamic rules associated with the app identifier of the associated third party app may be updated based on an event (e.g., a timer event, a counter event) indicating that the app identifier has been detected (e.g., via UI change events) but none of the associated dynamic rules matched the UI state of the associated third party app during a specified duration (e.g., a day, a week, a month for a timer event; some number (e.g., 1000) of detections of the app identifier for a counter event).

If a rules update is indicated, updated dynamic rules (e.g., associated with the app identifier) may be obtained at 325. For example, the updated dynamic rules may be obtained from a remote server via a dynamic rules update request. In one implementation, the updated dynamic rules may be obtained in a structured format, such as JSON, and parsed into an in-memory data structure (e.g., an array of rule data structures). See FIGS. 5 and 8 for examples of how a dynamic rule may be structured.

Dynamic rules associated with the app identifier of the associated third party app may be determined at 329. In one embodiment, dynamic rules utilized by the DUME app may be iterated to determine dynamic rules that match the app identifier (e.g., package name, website address, uniform resource identifier) of the associated third party app. In one implementation, each rule data structure may be parsed (e.g., using PHP commands) to determine the app identifier associated with the respective rule (e.g., based on the value of the package_name field).

A determination may be made at 333 whether there remain dynamic rules to process. In one implementation, each of the rule data structures with a matching app identifier may be processed. If there remain dynamic rules to process, the next dynamic rule may be selected for processing at 337.

A user interface match state for the selected dynamic rule may be determined at 341. In one embodiment, the user interface match state may specify UI elements (e.g., based on properties such as identifiers, classes, text patterns, relative relationships, and/or the like) of the associated third party app that should be present (e.g., visible on the client's screen) for the selected dynamic rule to match. For example, a user interface match state may be determined as a set of UI match elements that should be present and their relative positioning relative to other UI elements. In one implementation, the rule data structure associated with the selected dynamic rule may be parsed (e.g., using PHP commands) to determine the user interface match state for the selected dynamic rule (e.g., based on the value of the required_nodes field). See FIG. 3B for additional details regarding determining the user interface match state for the selected dynamic rule.

The accessibility API may be queried to determine a current UI state at 345. In one embodiment, the current UI state may describe what is currently displayed by the UI of the associated third party app. See FIG. 4A for an example of a displayed user interface and FIG. 4B for an example of a current UI state corresponding to the displayed user interface that may be obtained via the accessibility API. In one implementation, an API call (e.g., android.accessibilityservice.AccessibilityService.getRootInActiveWindow( )) may be made to obtain a root node of the associated third party app, and the root node and/or related nodes (e.g., child nodes) may specify the current UI state. Additional API calls (e.g., android.view.accessibility.AccessibilityNodeInfo.getViewIdResourceName( )) may be made to determine properties (e.g., identifiers, classes, text patterns, relative relationships) of a node. It is to be understood that, in some implementations, the current UI state may be cached and utilized during processing of subsequent dynamic rules.

A determination may be made at 349 whether the selected dynamic rule matches the current UI state. In one implementation, this determination may be made by ascertaining whether properties of each UI match element specified for the selected dynamic rule match the current UI state.

If the selected dynamic rule matches the current UI state, a determination may be made at 353 whether an active session data structure exists for the selected dynamic rule. In one embodiment, an active session data structure may store extracted properties for a set of report fields specified by a rule for a duration during which the rule continues to match current UI states of the associated third party app. In one implementation, this determination may be made based on whether an active session data structure matching the name (or another identifier) of the selected dynamic rule exists (e.g., in a hash table mapping rule names (or other identifiers) to active session data structures).

If an active session data structure for the selected dynamic rule does not exist, a new active session data structure for the selected dynamic rule may be created at 357. In one implementation, the newly created active session data structure may be populated with data such as a reference (e.g., rule name or another identifier) to the selected dynamic rule, a session start time (e.g., current time, time associated with the detected UI change event), and/or the like.

If an active session data structure for the selected dynamic rule already exists, the active session data structure for the selected dynamic rule may be determined at 361. In one implementation, a reference (or a pointer) to the active session data structure for the selected dynamic rule may be determined from a data store (e.g., a hash table) based on the name (or another identifier) of the selected dynamic rule.

User interface report fields for the selected rule may be determined at 365. In one embodiment, UI report fields may specify UI elements (e.g., based on properties such as identifiers, classes, text patterns, relative relationships, and/or the like) of the associated third party app for which properties (e.g., the visible text, content description, hint text, flags such as whether the item is selected, checked, focused, etc., the screen position of the UI element) should be extracted. In one implementation, the rule data structure associated with the selected dynamic rule may be parsed (e.g., using PHP commands) to determine the UI report fields (e.g., including specified properties to extract) for the selected dynamic rule (e.g., based on the value of the fields_to_report field). For example, the rule data structure may specify a UI match state and a set of properties to extract for each UI report field.

The accessibility API may be queried to extract specified properties for the UI report fields at 369. In one embodiment, specified properties of each matching UI report field with a UI match state (e.g., determined in a similar manner as discussed with regard to FIG. 3B, but for an individual UI element) that matches the current UI state may be extracted. In one implementation, one or more API calls (e.g., android-.view.accessibility.AccessibilityNodeInfo.getText( )) may be made to extract the specified properties of a respective matching UI report field. See FIG. 4C for an example of properties that may be extracted for a UI report field.

The active session data structure for the selected dynamic rule may be updated with the extracted data at 373. In one implementation, the active session data structure for the selected dynamic rule may be populated with data such as a field name (or another identifier) and properties data (e.g., a set of extracted property name/property value pairs) for each matching UI report field for which properties data was extracted. See data structure 630 in FIG. 6 for an example of how the extracted data may be stored in the active session data structure.

If the selected dynamic rule does not match the current UI state, a determination may be made at 377 whether an active session data structure exists for the selected dynamic rule. In one implementation, this determination may be made based on whether an active session data structure matching the name (or another identifier) of the selected dynamic rule exists (e.g., in a hash table mapping rule names (or other identifiers) to active session data structures).

If an active session data structure for the selected dynamic rule exists, the active session data structure for the selected dynamic rule may be transformed to ended state at 381. In one implementation, the active session data structure may be populated with data such as a session end time (e.g., current time, time associated with the detected UI change event), an ended flag indicating that a session is ended, and/or the like, and transformed into an ended session data structure that may be stored separately from active session data structures (e.g., so that active session data structures may be queried more efficiently). See FIG. 6 for an example of an ended session data structure.

Ended session data structures may be provided to a remote server at 385. For example, the ended session data structures may be sent to the remote server via a device usage data structure store request. In one implementation, once the rule data structures with a matching app identifier are processed, previously unsent ended session data structures may be sent to the remote server. In another implementation, previously unsent ended session data structures may be sent to the remote server in accordance with a specified schedule (e.g., daily, weekly, monthly).

Figure 3B:
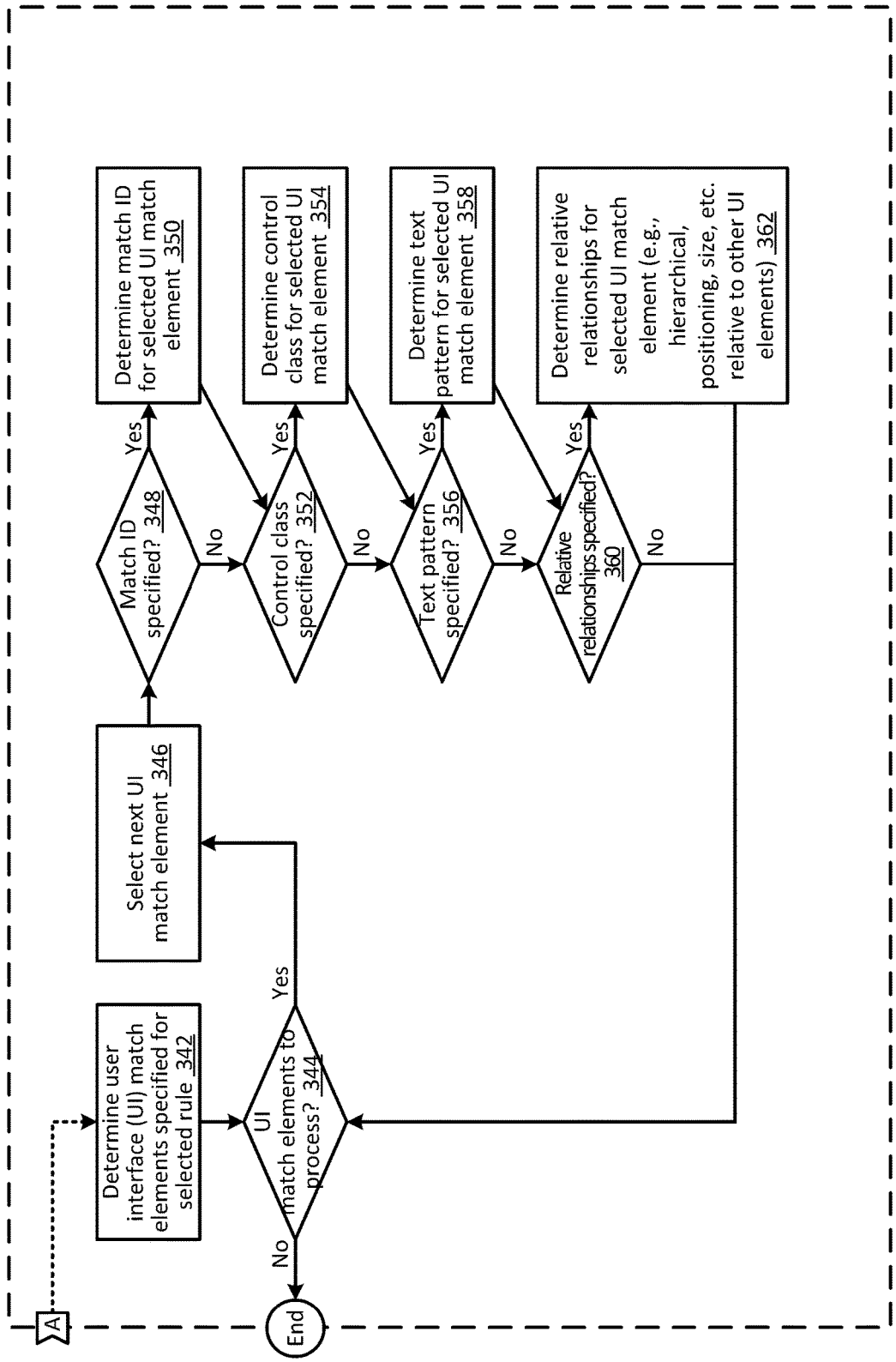

FIG. 3B shows additional details regarding determining the user interface match state for the selected dynamic rule in one embodiment of the DUME. In FIG. 3B, user interface (UI) match elements specified for the selected dynamic rule may be determined at 342. In one implementation, the rule data structure associated with the selected dynamic rule may be parsed (e.g., using PHP commands) to determine the UI match elements for the selected dynamic rule (e.g., based on the value of the required_nodes field (e.g., for determining a UI match state), based on the value of the fields_to_report field (e.g., for matching a UI report field)).

A determination may be made at 344 whether there remain UI match elements to process. In one implementation, each of the UI match elements may be processed. If there remain UI match elements to process, the next UI match element may be selected for processing at 346.

A determination may be made at 348 whether a match ID is specified for the selected UI match element. If so, the match ID for the selected UI match element may be determined at 350. In one implementation, the rule data structure associated with the selected dynamic rule may be parsed (e.g., using PHP commands) to determine the match ID (e.g., based on the value of the viewId field). It is to be understood that, in some embodiments, the match ID may be specified as a set of IDs that match.

A determination may be made at 352 whether a control class is specified for the selected UI match element. If so, the control class for the selected UI match element may be determined at 354. In one implementation, the rule data structure associated with the selected dynamic rule may be parsed (e.g., using PHP commands) to determine the control class (e.g., based on the value of the className field). It is to be understood that, in some embodiments, the control class may be specified as a set of control classes that match.

A determination may be made at 356 whether a text pattern is specified for the selected UI match element. If so, the text pattern for the selected UI match element may be determined at 358. In one implementation, the rule data structure associated with the selected dynamic rule may be parsed (e.g., using PHP commands) to determine the text pattern (e.g., based on the value of the textPattern field). It is to be understood that, in some embodiments, the text pattern may be specified using regular expressions.

A determination may be made at 360 whether any relative relationships are specified for the selected UI match element. If so, the relative relationships for the selected UI match element may be determined at 362. For example, relative relationships may include hierarchical relationships, positioning, size, etc. relative to other UI elements. In one implementation, the rule data structure associated with the selected dynamic rule may be parsed (e.g., using PHP commands) to determine the relative relationships (e.g., based on the values of the relationship, vertAlignment, minAspect, maxAspect, etc. fields).

In one embodiment, the determined match components (e.g., match ID, control class, text pattern, relative relationships) of the processed UI match elements may form the user interface match state for the selected dynamic rule.

Figure 4A:
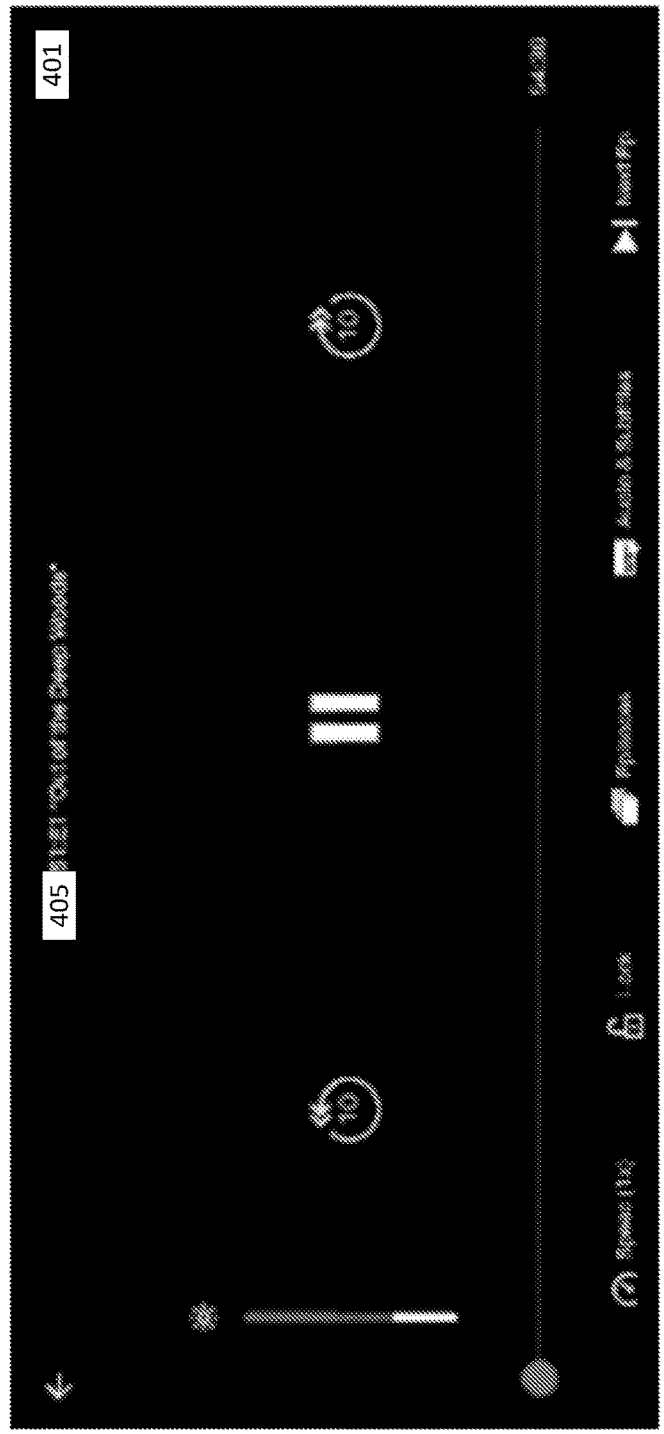
Figure 4B:
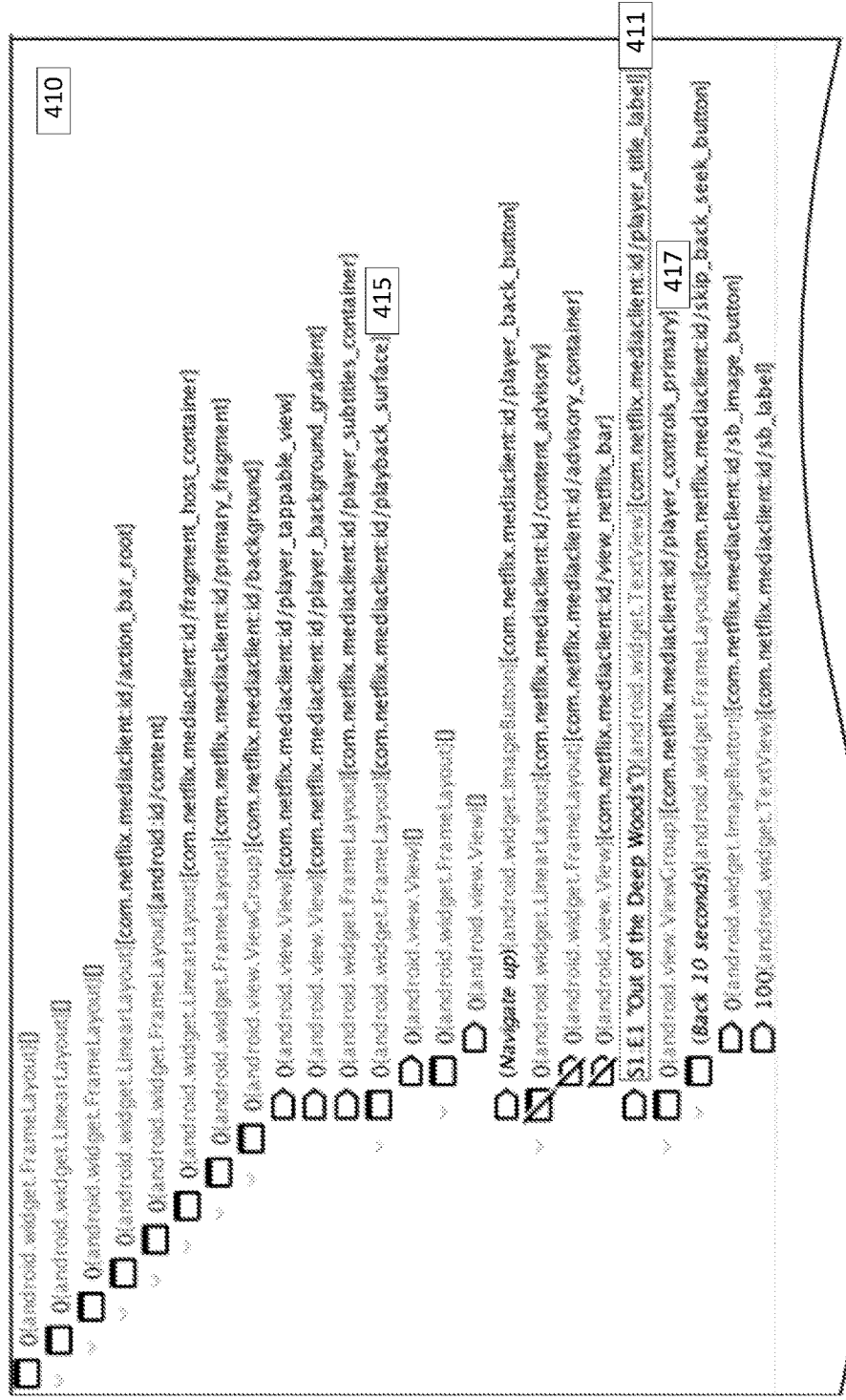

FIGS. 4A-C show screenshot diagram(s) in one embodiment of the DUME. In FIG. 4A, an exemplary user interface (e.g., for a mobile device, for a website) for a third party app is illustrated. Screen 401 shows various user interface elements currently displayed by the UI of the third party app, including a player title label 405.

In FIG. 4B, a snapshot (e.g., a current UI state) 410 that may be obtained via the accessibility API and corresponding to the displayed user interface shown in FIG. 4A is illustrated. In one embodiment, the current UI state may comprise a hierarchical data structure of user interface elements representing the state of the user interface of the third party app at a given time. For example, the current UI state may include a player_title_label element 411 corresponding to the player title label 405, a playback_surface element 415 and a player_controls_primary element 417. In one implementation, each element may have a number of properties such as a view identifier, text, a content description, a view class, and/or the like. In one embodiment, the elements may form a hierarchical data structure by having one element at the root with zero or more elements as child elements of the root element. Subsequent elements may have zero of more elements, forming a hierarchical data structure of arbitrary breadth and/or depth. The snapshot of the user interface obtained via the accessibility API does not contain a visual representation of the user interface elements of the third party app, thus is distinct from a screenshot, image, pixels or other purely visual representation.

In FIG. 4C, an exemplary data structure 420 showing property fields and property values associated with the player_title_label element 411 is illustrated. For example, a text property field 421 stores the text displayed by the player title label 405, a packageName property field 425 identifies the third party app, and a viewId property field 427 identifies the player_title_label element 411.

FIG. 5 shows data structure(s) in one embodiment of the DUME. In FIG. 5, an exemplary rule data structure 501 corresponding to a dynamic rule is illustrated. In one implementation, the rule data structure may include a rule identifier field 505, an app identifier field 510, a set of user interface elements that should be present for the dynamic rule to match 520, and a set of report fields 530. As shown, the app identifier field corresponds to the package name of the third party app discussed in FIGS. 4A-C, the set of user interface elements that should be present for the dynamic rule to match corresponds to the playback_surface element 415 and player_controls_primary element 417, and the set of report fields corresponds to the text property field 421 of the player_title_label element 411. In this example, the set of user interface elements that should be present for the dynamic rule to match is specified via the two identifiers indicated at 521 and 523. The dynamic rule matches when nodes with the two identifiers are found among accessibility nodes. The set of report fields may specify data such as a field name 531 that may be used to identify reported data in a session data structure, a set of nodes 533 (e.g., with each node identified by an identifier as shown at 535), a property 537 to extract from user interface elements matching the set of nodes, and/or the like.

FIG. 6 shows data structure(s) in one embodiment of the DUME. In FIG. 6, an exemplary session data structure (e.g., an ended session data structure) 601 is illustrated. In one implementation, the session data structure may include a rule identifier field 610 indicating the name of a dynamic rule that was matched to create the session data structure, session start and end times fields 620, and a set of extracted fields 630. As shown, the rule identifier field corresponds to the rule identifier field 505, a field name 631 of an extracted field corresponds to the field name 531, and a value property 633 of the extracted field corresponds to the property 537 and the player title label 405.

FIG. 7 shows screenshot diagram(s) in one embodiment of the DUME. In FIG. 7, an exemplary user interface (e.g., for a mobile device, for a website) for a third party app is illustrated. Screen 701 shows various user interface elements currently displayed by the UI of the third party app, including an informational text UI element 705, an order summary UI element 710, and a set of ordered products UI elements 715A-D.

Figure 8:
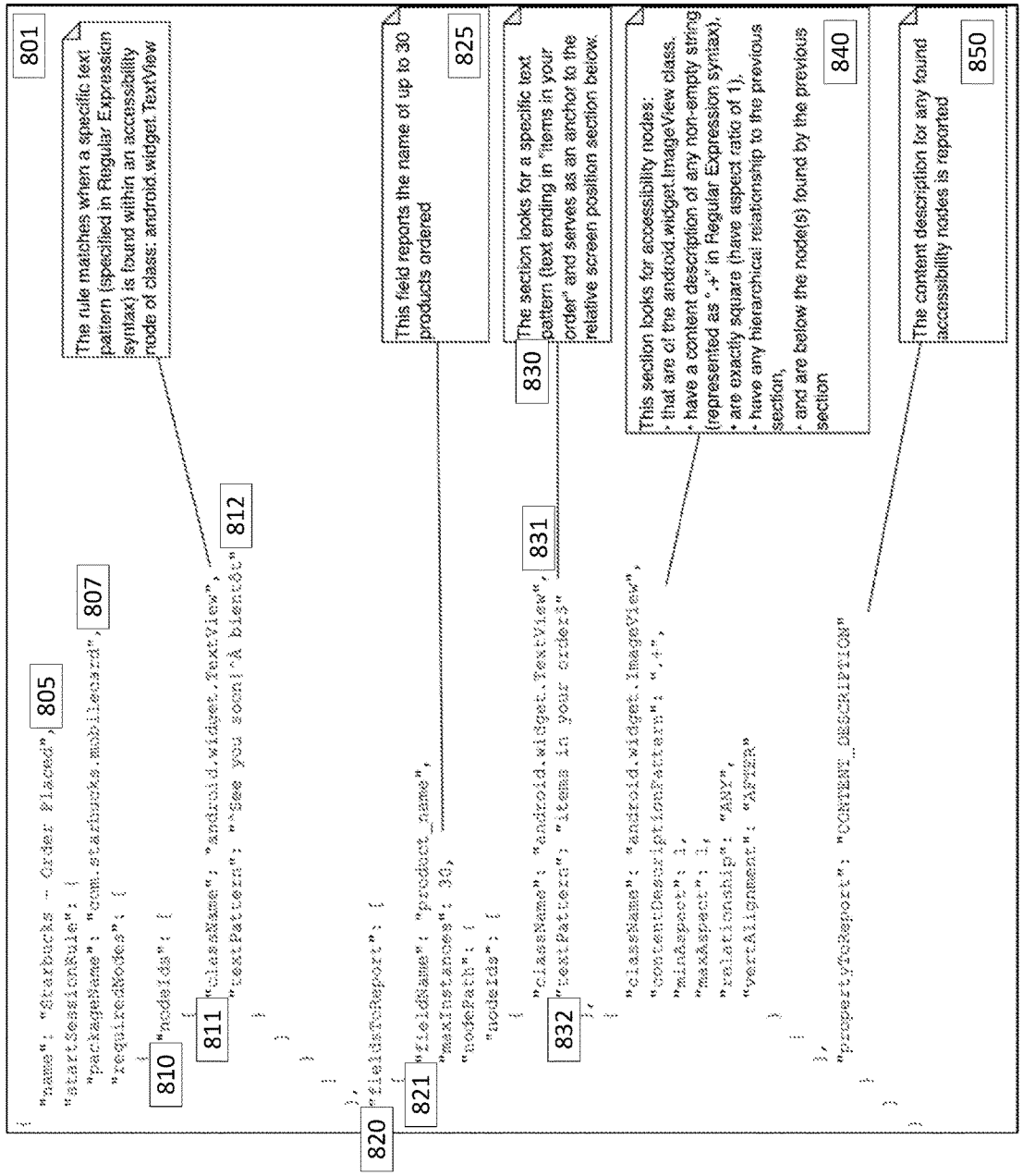
FIG. 8 shows data structure(s) in one embodiment of the DUME.

FIG. 8 shows data structure(s) in one embodiment of the DUME. In FIG. 8, an exemplary rule data structure 801 corresponding to a dynamic rule is illustrated. In one implementation, the rule data structure may include a rule identifier field 805, an app identifier field 807, a set of user interface elements that should be present for the dynamic rule to match 810, and a set of report fields 820. As shown, the app identifier field corresponds to the package name of the third party app discussed in FIG. 7, the set of user interface elements that should be present for the dynamic rule to match corresponds to the informational text UI element 705, and the set of report fields corresponds to content descriptions of the set of ordered products UI elements 715A-D. In this example, the set of user interface elements that should be present for the dynamic rule to match is specified via a class 811 and a text pattern 812. The dynamic rule matches when the text pattern is found within an accessibility node of the class. The set of report fields may specify data such as a field name 821 that may be used to identify reported data in a session data structure, a maximum number of instances to extract 825, an anchor section 830 that specifies an anchor node (e.g., specified via a class 831 and a text pattern 832), a screen position specification 840 that specifies relative screen positioning of a matching set of nodes relative to the anchor node, a property 850 to extract from the matching set of nodes, and/or the like.

Detailed Description of the DUME Coordinator

Figure 9:
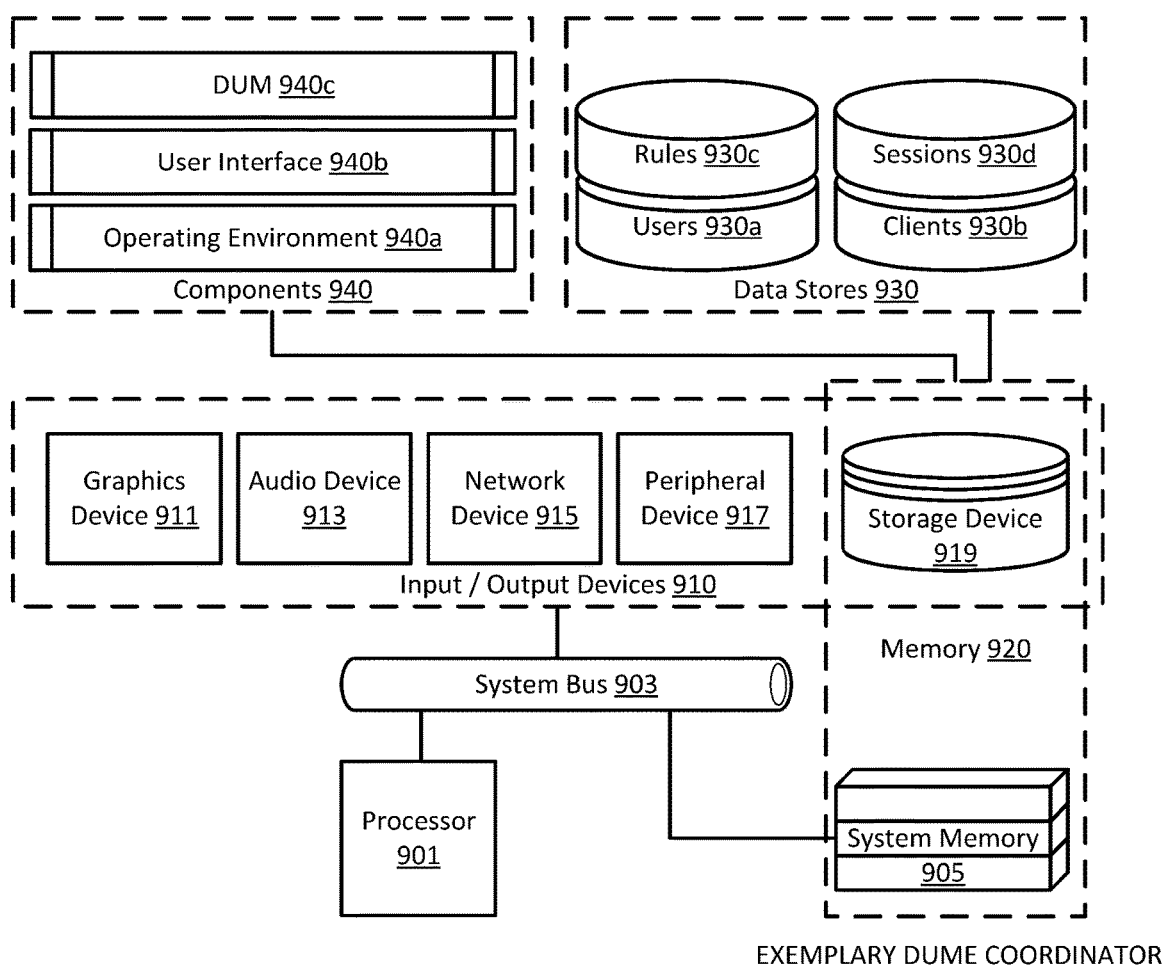
FIG. 9 shows a block diagram illustrating an exemplary DUME coordinator in one embodiment of the DUME.

FIG. 9 shows a block diagram illustrating an exemplary DUME coordinator in one embodiment of the DUME. The DUME coordinator facilitates the operation of the DUME via a computer system (e.g., one or more cloud computing systems (e.g., Microsoft Azure, Amazon Web Services, Google Cloud Platform), grid computing systems, virtualized computer systems, mainframe computers, servers, clients, nodes, desktops, mobile devices (e.g., such as smart phones, cellular phones, tablets, personal digital assistants (PDAs), smart watches, and/or the like), embedded computers, dedicated computers, system on a chip (SOC) devices, and/or the like). For example, the DUME coordinator may receive, obtain, aggregate, process, generate, store, retrieve, send, delete, input, output, and/or the like data (including program data and program instructions); may execute program instructions; may communicate with computer systems, with nodes, with users, and/or the like. In various embodiments, the DUME coordinator may comprise a standalone computer system, a distributed computer system, a node in a computer network (i.e., a network of computer systems organized in a topology), a network of DUME coordinators, and/or the like. It is to be understood that the DUME coordinator and/or the various DUME coordinator elements (e.g., processor, system bus, memory, input/output devices) may be organized in any number of ways (i.e., using any number and configuration of computer systems, computer networks, nodes, DUME coordinator elements, and/or the like) to facilitate DUME operation. Furthermore, it is to be understood that the various DUME coordinator computer systems, DUME coordinator computer networks, DUME coordinator nodes, DUME coordinator elements, and/or the like may communicate among each other in any number of ways to facilitate DUME operation. As used in this disclosure, the term "user" refers generally to people and/or computer systems that interact with the DUME; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; the term "node" refers generally to a server, to a client, and/or to an intermediary computer system, program, and/or a combination thereof that facilitates transmission of and/or handling of requests and/or responses.

The DUME coordinator includes a processor 901 that executes program instructions (e.g., DUME program instructions). In various embodiments, the processor may be a general purpose microprocessor (e.g., a central processing unit (CPU), an accelerated processing unit (APU)), a dedicated microprocessor (e.g., a graphics processing unit (GPU), a physics processing unit (PPU), a digital signal processor (DSP), a network processor, a tensor processing unit (TPU), a cryptographic processor, a biometrics processor, and/or the like), an external processor, a plurality of processors (e.g., working in parallel, distributed, and/or the like), a microcontroller (e.g., for an embedded system), and/or the like. The processor may be implemented using integrated circuits (ICs), application-specific integrated circuits (ASICs), field-programmable gate arrays (FPGAs), and/or the like. In various implementations, the processor may comprise one or more cores, may include embedded elements (e.g., a coprocessor such as a math coprocessor, an embedded dedicated microprocessor utilized as a coprocessor, registers, cache memory, software), may be synchronous (e.g., using a clock signal) or asynchronous (e.g., without a central clock), and/or the like. For example, the processor may be an AMD Ryzen processor, an AMD Epyc processor, an Intel Core processor, an Intel Xeon processor, an ARM Cortex processor, an Apple A processor, an Apple S processor, a Qualcomm Snapdragon processor, an IBM PowerPC processor, and/or the like.

The processor may be connected to system memory 905 via a system bus 903. The system bus may interconnect these and/or other elements of the DUME coordinator via electrical, electronic, optical, wireless, and/or the like communication links (e.g., the system bus may be integrated into a motherboard that interconnects DUME coordinator elements and provides power from a power supply). In various embodiments, the system bus may comprise one or more control buses, address buses, data buses, memory buses, peripheral buses, and/or the like. In various implementations, the system bus may be a parallel bus, a serial bus, a daisy chain design, a hub design, and/or the like. For example, the system bus may comprise a front-side bus, a back-side bus, AMD's Infinity Fabric, Intel's QuickPath Interconnect (QPI), a peripheral component interconnect (PCI) bus, a PCI Express bus, a low pin count (LPC) bus, a universal serial bus (USB), and/or the like. The system memory, in various embodiments, may comprise registers, cache memory (e.g., level one, level two, level three), volatile memory (e.g., random access memory (RAM) (e.g., static RAM (SRAM), dynamic RAM (DRAM)), non-volatile memory (e.g., read only memory (ROM), non-volatile random-access memory (NVRAM) (e.g., resistive random access memory (ReRAM), magnetoresistive random access memory (MRAM)), flash memory (e.g., NAND-type)), and/or the like. The system memory may utilize error-correcting code (ECC) technology to detect and/or correct internal data corruption. The system memory may be discreet, external, embedded, integrated into a CPU, and/or the like. The processor may access, read from, write to, store in, erase, modify, and/or the like, the system memory in accordance with program instructions (e.g., DUME program instructions) executed by the processor. The system memory may facilitate accessing, storing, retrieving, modifying, deleting, and/or the like data (e.g., DUME data) by the processor.

In various embodiments, input/output devices 910 may be connected to the processor and/or to the system memory, and/or to one another via the system bus.

In some embodiments, the input/output devices may include one or more graphics devices 911. The processor may make use of the one or more graphic devices in accordance with program instructions (e.g., DUME program instructions) executed by the processor. In one implementation, a graphics device may be a video card that may obtain (e.g., via a connected video camera), process (e.g., render a frame), output (e.g., via a connected monitor, television, and/or the like), and/or the like graphical (e.g., multimedia, video, image, text) data (e.g., DUME data). A video card may be connected to the system bus via an interface such as PCI, PCI Express, USB, PC Card, ExpressCard, Thunderbolt, NVLink, and/or the like. A video card may use one or more graphics processing units (GPUs), for example, by utilizing AMD's CrossFireX and/or NVIDIA's SLI technologies. A video card may be connected via an interface (e.g., video graphics array (VGA), digital video interface (DVI), Mini-DVI, Micro-DVI, high-definition multimedia interface (HDMI), DisplayPort, Thunderbolt, composite video, S-Video, component video, and/or the like) to one or more displays (e.g., cathode ray tube (CRT), liquid crystal display (LCD), touchscreen, video projector, and/or the like) that display graphics. For example, a video card may be an AMD Radeon, an NVIDIA GeForce RTX, an Intel UHD Graphics, and/or the like. In another implementation, a graphics device may be a video capture board that may obtain (e.g., via coaxial cable), process (e.g., overlay with other graphical data), capture, convert (e.g., between different formats, such as MPEG2 to H. 264), and/or the like graphical data. A video capture board may be and/or include a TV tuner, may be compatible with a variety of broadcast signals (e.g., NTSC, PAL, ATSC, QAM) may be a part of a video card, and/or the like. For example, a video capture board may be a Hauppauge ImpactVCB, a Hauppauge WinTV-HVR, a Hauppauge Colossus, and/or the like. A graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 913. The processor may make use of the one or more audio devices in accordance with program instructions (e.g., DUME program instructions) executed by the processor. In one implementation, an audio device may be a sound card that may obtain (e.g., via a connected microphone), process, output (e.g., via connected speakers), and/or the like audio data (e.g., DUME data). A sound card may be connected to the system bus via an interface such as PCI, PCI Express, USB, PC Card, ExpressCard, Thunderbolt, and/or the like. A sound card may be connected via an interface (e.g., tip sleeve (TS), tip ring sleeve (TRS), RCA, TOSLINK, optical) to one or more amplifiers, speakers (e.g., mono, stereo, surround sound), subwoofers, digital musical instruments, and/or the like. For example, a sound card may be an Intel AC'97 integrated codec chip, an Intel HD Audio integrated codec chip, a Creative Sound Blaster, and/or the like. An audio device may be discreet, external, embedded, integrated into a motherboard (e.g., via a chipset), and/or the like. An audio device may operate in combination with other audio devices (e.g., in parallel) to provide improved capabilities, data throughput, audio quality, and/or the like.

In some embodiments, the input/output devices may include one or more network devices 915. The processor may make use of the one or more network devices in accordance with program instructions (e.g., DUME program instructions) executed by the processor. In one implementation, a network device may be a network card that may obtain (e.g., via a Category 6 Ethernet cable), process, output (e.g., via a wireless antenna), and/or the like network data (e.g., DUME data). A network card may be connected to the system bus via an interface such as PCI, PCI Express, USB, FireWire, PC Card, ExpressCard, Thunderbolt, and/or the like. A network card may be a wired network card (e.g., 10/100/1000BASE-T, optical fiber), a wireless network card (e.g., Wi-Fi 802.11ac/ad/ax/ay, Bluetooth, Near Field Communication (NFC), TransferJet), a modem (e.g., dialup telephone-based, asymmetric digital subscriber line (ADSL), cable modem, power line modem, wireless modem based on cellular protocols such as high speed packet access (HSPA), evolution-data optimized (EV-DO), global system for mobile communications (GSM), worldwide interoperability for microwave access (WiMax), long term evolution (LTE), 5G, and/or the like, satellite modem, FM radio modem, radio-frequency identification (RFID) modem, infrared (IR) modem), and/or the like. For example, a network card may be an Intel Gigabit Adapter, a LINKSYS USB Ethernet Adapter, an ASUS wireless Bluetooth and Gigagbit WiFi adapter, a Motorola SURFboard Cable Modem, a U. S. Robotics Faxmodem, a Zoom ADSL Modem/Router, a TRENDnet Powerline Ethernet Adapter, a StarTech Gigabit Ethernet Multi Mode Fiber Media Converter, a Broadcom NFC controller, a Qualcomm Snapdragon 4G LTE and 5G modem, a Toshiba TransferJet device, and/or the like. A network device may be discreet, external, embedded, integrated into a motherboard, and/or the like. A network device may operate in combination with other network devices (e.g., in parallel) to provide improved data throughput, redundancy, and/or the like. For example, protocols such as link aggregation control protocol (LACP) (e.g., based on IEEE 802.3AD or IEEE 802.1AX standards) may be used. A network device may be used to connect to a local area network (LAN), a wide area network (WAN), a metropolitan area network (MAN), a personal area network, the Internet, an intranet, a Bluetooth network, an NFC network, a Wi-Fi network, a cellular network, and/or the like.

In some embodiments, the input/output devices may include one or more peripheral devices 917. The processor may make use of the one or more peripheral devices in accordance with program instructions (e.g., DUME program instructions) executed by the processor. In various implementations, a peripheral device may be a digital camera, a video camera, a webcam, an electronically movable pan tilt zoom (PTZ) camera, a monitor, a touchscreen display, active shutter 3D glasses, head-tracking 3D glasses, a virtual reality (VR) headset, an augmented reality (AR) headset, a remote control, an audio line-in, an audio line-out, a microphone, headphones, speakers, a subwoofer, an amplifier, a router, a hub, a switch, a firewall, an antenna, a keyboard, a mouse, a trackpad, a trackball, a digitizing tablet, a stylus, a joystick, a gamepad, a game controller, a force-feedback device, a laser, sensors (e.g., proximity sensor, rangefinder, ambient temperature sensor, ambient light sensor, humidity sensor, an accelerometer, a gyroscope, a motion sensor, an olfaction sensor, a biosensor, a biometric sensor, a chemical sensor, a magnetometer, a radar, a sonar, a location sensor such as global positioning system (GPS), Galileo, GLONASS, and/or the like), a printer, a fax, a scanner, a copier, a card reader, a fingerprint reader, a pin entry device (PED), a Trusted Platform Module (TPM), a hardware security module (HSM), and/or the like. A peripheral device may be connected to the system bus via an interface such as PCI, PCI Express, USB, FireWire, VGA, DVI, Mini-DVI, Micro-DVI, HDMI, DisplayPort, Thunderbolt, composite video, S-Video, component video, PC Card, ExpressCard, serial port, parallel port, PS/2, TS, TRS, RCA, TOSLINK, network connection (e.g., wired such as Ethernet, optical fiber, and/or the like; wireless such as Wi-Fi, Bluetooth, NFC, cellular, 5G, and/or the like), a connector of another input/output device, and/or the like. A peripheral device may be discreet, external, embedded, integrated (e.g., into a processor, into a motherboard), and/or the like. A peripheral device may operate in combination with other peripheral devices (e.g., in parallel) to provide the DUME coordinator with a variety of input, output and processing capabilities.

In some embodiments, the input/output devices may include one or more storage devices 919. The processor may access, read from, write to, store in, erase, modify, and/or the like a storage device in accordance with program instructions (e.g., DUME program instructions) executed by the processor. A storage device may facilitate accessing, storing, retrieving, modifying, deleting, and/or the like data (e.g., DUME data) by the processor. In one implementation, the processor may access data from the storage device directly via the system bus. In another implementation, the processor may access data from the storage device by instructing the storage device to transfer the data to the system memory and accessing the data from the system memory. In various embodiments, a storage device may be a hard disk drive (HDD), a solid-state drive (SSD), an optical disk drive (e.g., compact disk (CD-ROM) drive, CD-Recordable (CD-R) drive, CD-Rewritable (CD-RW) drive, digital versatile disc (DVD-ROM) drive, DVD-R drive, DVD-RW drive, Blu-ray disk (BD) drive) using an optical medium, a magnetic tape drive using a magnetic tape, a memory card (e.g., a USB flash drive, a compact flash (CF) card, a secure digital extended capacity (SDXC) card), a network attached storage (NAS), a direct-attached storage (DAS), a storage area network (SAN), other processor-readable physical mediums, and/or the like. A storage device may be connected to the system bus via an interface such as PCI, PCI Express, USB, FireWire, PC Card, ExpressCard, Thunderbolt, integrated drive electronics (IDE), serial advanced technology attachment (SATA), non-volatile memory express (NVMe), external SATA (eSATA), small computer system interface (SCSI), serial attached SCSI (SAS), fibre channel (FC), network connection (e.g., wired such as Ethernet, optical fiber, and/or the like; wireless such as Wi-Fi, Bluetooth, NFC, cellular, 5G, and/or the like), and/or the like. A storage device may be discreet, external, embedded, integrated (e.g., into a motherboard, into another storage device), and/or the like. A storage device may operate in combination with other storage devices to provide improved capacity, data throughput, data redundancy, and/or the like. For example, protocols such as redundant array of independent disks (RAID) (e.g., RAID 0 (striping), RAID 1 (mirroring), RAID 5 (striping with distributed parity), hybrid RAID), just a bunch of drives (JBOD), and/or the like may be used. In another example, virtual and/or physical drives may be pooled to create a storage pool (e.g., for virtual storage, cloud storage, and/or the like). In yet another example, an SSD cache may be used with an HDD to improve speed.

Together and/or separately the system memory 905 and the one or more storage devices 919 may be referred to as memory 920 (i.e., physical memory).

DUME memory 920 contains processor-operable (e.g., accessible) DUME data stores 930. Data stores 930 comprise data that may be used (e.g., by the DUME) via the DUME coordinator. Such data may be organized using one or more data formats such as a database (e.g., a relational database with database tables, an object-oriented database, a graph database, a hierarchical database, a key-value NoSQL database), a flat file (e.g., organized into a tabular format), a binary file (e.g., a GIF file, an MPEG-4 file), a structured file (e.g., an HTML file, an XML file), a text file, and/or the like. Furthermore, data may be organized using one or more data structures such as an array, a queue, a stack, a set, a linked list, a map, a tree, a hash table, a record, an object, a directed graph, and/or the like. In various embodiments, data stores may be organized in any number of ways (i.e., using any number and configuration of data formats, data structures, DUME coordinator elements, and/or the like) to facilitate DUME operation. For example, DUME data stores may comprise data stores 930a-d implemented as one or more databases. A users data store 930a may be a collection of database tables that include fields such as UserID, UserName, UserPreferences, and/or the like. A clients data store 930b may be a collection of database tables that include fields such as ClientID, ClientName, ClientDeviceType, ClientScreenResolution, and/or the like. A rules data store 930c may be a collection of database tables that include fields such as RuleID, RuleName, RuleVersion, AssociatedAppID, AssociatedUserinterfaceNodesToMatchDetails, AssociatedReportFieldsDetails, and/or the like. A sessions data store 930d may be a collection of database tables that include fields such as SessionID, AssociatedRuleID, AssociatedRuleName, SessionStartTime, SessionEndTime, ExtractedFieldsDetails, and/or the like. The DUME coordinator may use data stores 930 to keep track of inputs, parameters, settings, variables, records, outputs, and/or the like.

DUME memory 920 contains processor-operable (e.g., executable) DUME components 940. Components 940 comprise program components (including program instructions and any associated data stores) that are executed (e.g., by the DUME) via the DUME coordinator (i.e., via the processor) to transform DUME inputs into DUME outputs. It is to be understood that the various components and their subcomponents, capabilities, applications, and/or the like may be organized in any number of ways (i.e., using any number and configuration of components, subcomponents, capabilities, applications, DUME coordinator elements, and/or the like) to facilitate DUME operation. Furthermore, it is to be understood that the various components and their subcomponents, capabilities, applications, and/or the like may communicate among each other in any number of ways to facilitate DUME operation. For example, the various components and their subcomponents, capabilities, applications, and/or the like may be combined, integrated, consolidated, split up, distributed, and/or the like in any number of ways to facilitate DUME operation. In another example, a single or multiple instances of the various components and their subcomponents, capabilities, applications, and/or the like may be instantiated on each of a single DUME coordinator node, across multiple DUME coordinator nodes, and/or the like.

In various embodiments, program components may be developed using one or more programming languages, techniques, tools, and/or the like such as an assembly language, Ada, BASIC, C, C++, C#, COBOL, Fortran, Java, LabVIEW, Lisp, Mathematica, MATLAB, OCaml, PL/I, Smalltalk, Visual Basic for Applications (VBA), HTML, XML, CSS, JavaScript, JavaScript Object Notation (JSON), PHP, Perl, Ruby, Python, Asynchronous JavaScript and XML (AJAX), WebSocket Protocol, Simple Object Access Protocol (SOAP), SSL, ColdFusion, Microsoft .NET, Apache modules, Adobe Flash, Adobe AIR, Microsoft Silverlight, Windows PowerShell, batch files, Tcl, graphical user interface (GUI) toolkits, SQL, database adapters, web application programming interfaces (APIs), web frameworks (e.g., Ruby on Rails, AngularJS), application server extensions, integrated development environments (IDES), libraries (e.g., object libraries, class libraries, remote libraries), remote procedure calls (RPCs), Common Object Request Broker Architecture (CORBA), and/or the like.

In some embodiments, components 940 may include an operating environment component 940a. The operating environment component may facilitate operation of the DUME via various subcomponents.

In some implementations, the operating environment component may include an operating system subcomponent. The operating system subcomponent may provide an abstraction layer that facilitates the use of, communication among, common services for, interaction with, security of, and/or the like of various DUME coordinator elements, components, data stores, and/or the like.

In some embodiments, the operating system subcomponent may facilitate execution of program instructions (e.g., DUME program instructions) by the processor by providing process management capabilities. For example, the operating system subcomponent may facilitate the use of multiple processors, the execution of multiple processes, the execution of multiple threads, multitasking, and/or the like.

In some embodiments, the operating system subcomponent may facilitate the use of memory by the DUME. For example, the operating system subcomponent may allocate and/or free memory, facilitate memory addressing, provide memory segmentation and/or protection, provide virtual memory capability, facilitate caching, and/or the like. In another example, the operating system subcomponent may include a file system (e.g., File Allocation Table (FAT), New Technology File System (NTFS), Hierarchical File System Plus (HFS+), Apple File System (APFS), Universal Disk Format (UDF), Linear Tape File System (LTFS)) to facilitate storage, retrieval, deletion, aggregation, processing, generation, and/or the like of data.

In some embodiments, the operating system subcomponent may facilitate operation of and/or processing of data for and/or from input/output devices. For example, the operating system subcomponent may include one or more device drivers, interrupt handlers, file systems, and/or the like that allow interaction with input/output devices.

In some embodiments, the operating system subcomponent may facilitate operation of the DUME coordinator as a node in a computer network by providing support for one or more communications protocols. For example, the operating system subcomponent may include support for the internet protocol suite (i.e., Transmission Control Protocol/Internet Protocol (TCP/IP)) of network protocols such as IP, IPsec, Mobile IP, TCP, User Datagram Protocol (UDP), and/or the like. In another example, the operating system subcomponent may include support for security protocols (e.g., Wired Equivalent Privacy (WEP), Wi-Fi Protected Access (WPA), WPA2, WPA3) for wireless computer networks. In yet another example, the operating system subcomponent may include support for virtual private networks (VPNs).

In some embodiments, the operating system subcomponent may facilitate security of the DUME coordinator. For example, the operating system subcomponent may provide services such as authentication, authorization, audit, network intrusion-detection capabilities, firewall capabilities, antivirus capabilities, and/or the like.

In some embodiments, the operating system subcomponent may facilitate user interaction with the DUME by providing user interface elements that may be used by the DUME to generate a user interface. In one implementation, such user interface elements may include widgets (e.g., windows, dialog boxes, scrollbars, menu bars, tabs, ribbons, menus, buttons, text boxes, checkboxes, combo boxes, dropdown lists, list boxes, radio buttons, sliders, spinners, grids, labels, progress indicators, icons, tooltips, and/or the like) that may be used to obtain input from and/or provide output to the user. For example, such widgets may be used via a widget toolkit such as Microsoft Foundation Classes (MFC), Apple Cocoa Touch, Java Swing, JavaFX, jQuery UI, GTK, Qt, and/or the like. In another implementation, such user interface elements may include sounds (e.g., event notification sounds stored in MP3 file format), animations, vibrations, and/or the like that may be used to inform the user regarding occurrence of various events. For example, the operating system subcomponent may include a user interface such as Windows Aero, Windows Metro, macOS X Aqua, macOS X Flat, GNOME Shell, KDE Plasma Workspaces (e.g., Plasma Desktop, Plasma Netbook, Plasma Contour, Plasma Mobile), and/or the like.

In various embodiments the operating system subcomponent may comprise a single-user operating system, a multi-user operating system, a single-tasking operating system, a multitasking operating system, a single-processor operating system, a multiprocessor operating system, a distributed operating system, an embedded operating system, a real-time operating system, and/or the like. For example, the operating system subcomponent may comprise an operating system such as UNIX, LINUX, IBM i, Sun Solaris, Microsoft Windows Server, Microsoft DOS, Microsoft Windows 10, Apple Mac OS X, Apple iOS, Google Android, and/or the like.

In some implementations, the operating environment component may include a database subcomponent. The database subcomponent may facilitate DUME capabilities such as storage, analysis, retrieval, access, modification, deletion, aggregation, generation, and/or the like of data (e.g., the use of data stores 930). The database subcomponent may make use of database languages (e.g., Structured Query Language (SQL), XQuery, Cassandra Query Language (CQL)), stored procedures, triggers, APIs, and/or the like to provide these capabilities. In various embodiments the database subcomponent may comprise a cloud database, a data warehouse, a distributed database, an embedded database, a parallel database, a real-time database, and/or the like. For example, the database subcomponent may comprise a database such as Microsoft SQL Server, Microsoft Access, MySQL, IBM DB2, Oracle Database, Apache Cassandra database, MongoDB, and/or the like.

In some implementations, the operating environment component may include an information handling subcomponent. The information handling subcomponent may provide the DUME with capabilities to serve, deliver, upload, obtain, present, download, and/or the like a variety of information. The information handling subcomponent may use protocols such as Hypertext Transfer Protocol (HTTP), Hypertext Transfer Protocol Secure (HTTPS), File Transfer Protocol (FTP), Telnet, Secure Shell (SSH), Transport Layer Security (TLS), Secure Sockets Layer (SSL), peer-to-peer (P2P) protocols (e.g., BitTorrent, Bitcoin), and/or the like to handle communication of information such as web pages, files, multimedia content (e.g., streaming media), applications, transactions, and/or the like.

In some embodiments, the information handling subcomponent may facilitate the serving of information to users, DUME components, nodes in a computer network, web browsers, and/or the like. For example, the information handling subcomponent may comprise a web server such as Apache HTTP Server, Microsoft Internet Information Services (IIS), Oracle WebLogic Server, Adobe Flash Media Server, Adobe Content Server, and/or the like. Furthermore, a web server may include extensions, plug-ins, add-ons, servlets, and/or the like. For example, these may include Apache modules, IIS extensions, Java servlets, and/or the like. In some implementations, the information handling subcomponent may communicate with the database subcomponent via standards such as Open Database Connectivity (ODBC), Java Database Connectivity (JDBC), ActiveX Data Objects for .NET (ADO.NET), and/or the like. For example, the information handling subcomponent may use such standards to store, analyze, retrieve, access, modify, delete, aggregate, generate, and/or the like data (e.g., data from data stores 930) via the database subcomponent.

In some embodiments, the information handling subcomponent may facilitate presentation of information obtained from users, DUME components, nodes in a computer network, web servers, and/or the like. For example, the information handling subcomponent may comprise a web browser such as Microsoft Internet Explorer, Microsoft Edge, Mozilla Firefox, Apple Safari, Google Chrome, Opera Mobile, Amazon Silk, Nintendo 3DS Internet Browser, and/or the like. Furthermore, a web browser may include extensions, plug-ins, add-ons, applets, and/or the like. For example, these may include Adobe Flash Player, Adobe Acrobat plug-in, Microsoft Silverlight plug-in, Microsoft Office plug-in, Java plug-in, and/or the like.

In some implementations, the operating environment component may include a messaging subcomponent. The messaging subcomponent may facilitate DUME message communications capabilities. The messaging subcomponent may use protocols such as Simple Mail Transfer Protocol (SMTP), Internet Message Access Protocol (IMAP), Post Office Protocol (POP), Extensible Messaging and Presence Protocol (XMPP), Real-time Transport Protocol (RTP), Internet Relay Chat (IRC), Skype protocol, Messaging Application Programming Interface (MAPI), Facebook API, a custom protocol, and/or the like to facilitate DUME message communications. The messaging subcomponent may facilitate message communications such as email, instant messaging, Voice over IP (VoIP), video conferencing, Short Message Service (SMS), web chat, in-app messaging (e.g., alerts, notifications), and/or the like. For example, the messaging subcomponent may comprise Microsoft Exchange Server, Microsoft Outlook, Sendmail, IBM Domino, IBM Notes, Gmail, ICQ, Trillian, Skype, Google Hangouts, Apple FaceTime, Apple iChat, Facebook Chat, and/or the like.

In some implementations, the operating environment component may include a security subcomponent that facilitates DUME security. In some embodiments, the security subcomponent may restrict access to the DUME, to one or more services provided by the DUME, to data associated with the DUME (e.g., stored in data stores 930), to communication messages associated with the DUME, and/or the like to authorized users. Access may be granted via a login screen, via an API that obtains authentication information, via an authentication token, via a cryptographic key (e.g., stored in an HSM), and/or the like. For example, the user may obtain access by providing a username and/or a password (e.g., a string of characters, a picture password), a personal identification number (PIN), an identification card, a magnetic stripe card, a smart card, a biometric identifier (e.g., a finger print, a voice print, a retina scan, a face scan), a gesture (e.g., a swipe), a media access control (MAC) address, an IP address, and/or the like. Various security models such as access-control lists (ACLS), capability-based security, hierarchical protection domains, multi-factor authentication, and/or the like may be used to control access. For example, the security subcomponent may facilitate digital rights management (DRM), network intrusion detection, firewall capabilities, cryptographic wallet access (e.g., for cryptocurrencies such as Bitcoin, Ethereum, and/or the like), and/or the like.

In some embodiments, the security subcomponent may use cryptographic techniques to secure information (e.g., by storing encrypted data), verify message authentication (e.g., via a digital signature), provide integrity checking (e.g., a checksum), authorize transactions (e.g., using a private key), and/or the like by facilitating encryption and/or decryption of data. Furthermore, steganographic techniques may be used instead of or in combination with cryptographic techniques. Cryptographic techniques used by the DUME may include symmetric key cryptography using shared keys (e.g., using one or more block ciphers such as triple Data Encryption Standard (DES), Advanced Encryption Standard (AES); stream ciphers such as Rivest Cipher 4 (RC4), Rabbit), asymmetric key cryptography using a public key/private key pair (e.g., using algorithms such as Rivest-Shamir-Adleman (RSA), Elliptic Curve Digital Signature Algorithm (ECDSA)), cryptographic hash functions (e.g., using algorithms such as Message-Digest 5 (MD5), Secure Hash Algorithm 3 (SHA-3)), and/or the like. For example, the security subcomponent may comprise a cryptographic system such as Pretty Good Privacy (PGP).

In some implementations, the operating environment component may include a virtualization subcomponent that facilitates DUME virtualization capabilities. The virtualization subcomponent may include hypervisors (e.g., Type-1 native hypervisors, Type-2 hosted hypervisors), virtual machines (VMs), and/or the like. In some embodiments, the virtualization subcomponent may provide support for platform virtualization (e.g., via a virtual machine). Platform virtualization types may include full virtualization, partial virtualization, paravirtualization, and/or the like. In some implementations, platform virtualization may be hardware-assisted (e.g., via support from the processor using technologies such as AMD-V, Intel VT-x, and/or the like). In some embodiments, the virtualization subcomponent may provide support for various other virtualized environments such as via operating-system level virtualization, desktop virtualization, workspace virtualization, mobile virtualization, application virtualization, database virtualization, and/or the like. In some embodiments, the virtualization subcomponent may provide support for various virtualized resources such as via processing resources virtualization, memory virtualization, storage virtualization, data virtualization, network virtualization, and/or the like. For example, the virtualization subcomponent may comprise VMware software suite (e.g., VMware Workstation, VMware Player, VMware ESXi, VMware ThinApp, VMware Infrastructure), Parallels software suite (e.g., Parallels Server, Parallels Desktop), Virtuozzo software suite (e.g., Virtuozzo Infrastructure Platform, Virtuozzo), Oracle software suite (e.g., Oracle VM Server for SPARC, Oracle VM Server for x86, Oracle VM VirtualBox, Oracle Solaris 11), Wine, and/or the like.

In some embodiments, components 940 may include a user interface component 940b. The user interface component may facilitate user interaction with the DUME by providing a user interface. In various implementations, the user interface component may include programmatic instructions to obtain input from and/or provide output to the user via physical controls (e.g., physical buttons, switches, knobs, wheels, dials), textual user interface, audio user interface, GUI, voice recognition, gesture recognition, touch and/or multi-touch user interface, messages, APIs, and/or the like. In some implementations, the user interface component may make use of the user interface elements provided by the operating system subcomponent of the operating environment component. For example, the user interface component may make use of the operating system subcomponent's user interface elements via a widget toolkit. In some implementations, the user interface component may make use of information presentation capabilities provided by the information handling subcomponent of the operating environment component. For example, the user interface component may make use of a web browser to provide a user interface via HTML5, Adobe Flash, Microsoft Silverlight, and/or the like.

In some embodiments, components 940 may include any of the components DUM 940c, etc. described in more detail in preceding figures and/or in appendices.

Additional embodiments may include:

1. A device usage measurement apparatus, comprising:
   at least one memory;
   at least one processor in communication with the at least one memory, the at least one processor configured to execute processing instructions stored in the at least one memory, in which the at least one processor executes processor-executable instructions to:
   detect, via the at least one processor, a user interface change event;
   determine, via the at least one processor, an app identifier of an associated third party app;
   determine, via the at least one processor, a dynamic rule data structure associated with the app identifier of the associated third party app, in which the dynamic rule data structure is structured to specify a user interface match state and at least one user interface report field;

determine, via the at least one processor, the user interface match state specified by the dynamic rule data structure, in which the user interface match state is structured to specify at least one user interface element of the associated third party app based on either: (1) absolute screen position of the at least one user interface element or (2) screen position of the at least one user interface element relative to another user interface element of the associated third party app;

determine, via the at least one processor, a current user interface state of the associated third party app by querying an accessibility API, in which the current user interface state is structured to specify data regarding a set of currently displayed user interface elements of the associated third party app;

determine, via the at least one processor, that the user interface match state matches the current user interface state;

determine, via the at least one processor, the at least one user interface report field specified by the dynamic rule data structure, in which the at least one user interface report field is structured to specify a report field user interface match state and at least one report field property to extract;

extract, via the at least one processor, the at least one report field property of the at least one user interface report field by querying the accessibility API to obtain a property value from a report user interface element of the associated third party app matching the report field user interface match state; and update, via the at least one processor, an active session data structure associated with the dynamic rule data structure to store the extracted property value.

2. The apparatus of embodiment 1, in which the user interface change event is one of: an accessibility event, a timer event, a window event, an input event, a system event.

3. The apparatus of embodiment 1, in which the user interface change event is an accessibility event detected for a specified set of app identifiers of third party apps.

4. The apparatus of embodiment 1, in which the app identifier is one of: a package name, an application bundle identifier, an application name, an executable file name, a process name, a window title, a uniform resource identifier.

5. The apparatus of embodiment 1, in which the associated third party app is a foreground 6. The apparatus of embodiment 1, in which the dynamic rule data structure is structured to specify the app identifier.

7. The apparatus of embodiment 1, in which the at least one user interface element of the associated third party app is further specified based on at least one of: identifier, control class, text pattern.

8. The apparatus of embodiment 1, in which the at least one user interface element of the associated third party app is further specified based on a relative relationship of the at least one user interface element relative to the other user interface element.

9. The apparatus of embodiment 8, in which the relative relationship is a hierarchical relationship of the at least one user interface element relative to the other user interface element.

10. The apparatus of embodiment 1, in which the at least one user interface element of the associated third party app is further specified based on an aspect ratio of the at least one user interface element.

11. The apparatus of embodiment 1, in which the instructions to determine the current user interface state further comprise instructions to retrieve the current user interface state from a cache.

12. The apparatus of embodiment 1, in which the instructions to determine that the user interface match state matches the current user interface state further comprise instructions to ascertain that the set of currently displayed user interface elements of the associated third party app includes the at least one user interface element.

13. The apparatus of embodiment 1, in which the report field user interface match state is structured to specify the report user interface element.

14. The apparatus of embodiment 1, in which the report field user interface match state is structured to specify either: (1) absolute screen position of the report user interface element or (2) screen position of the report user interface element relative to some other user interface element.

15. The apparatus of embodiment 1, in which the active session data structure is newly created and populated with a session start time corresponding to the detected user interface change event.

16. The apparatus of embodiment 1, in which the active session data structure is an existing data structure populated with a session start time corresponding to a previously detected user interface change event.

17. The apparatus of embodiment 1, in which the processor-executable instructions further comprise instructions to:

detect, via the at least one processor, a subsequent user interface change event;

determine, via the at least one processor, that the user interface match state does not match a subsequent user interface state of the associated third party app; and transform, via the at least one processor, the active session data structure to ended state, in which the active session data structure is transformed into an ended session data structure that is stored separately from active session data structures.

18. The apparatus of embodiment 17, in which the processor-executable instructions further comprise instructions to send the ended session data structure to a remote server in accordance with a specified schedule.

19. The apparatus of embodiment 1, in which the processor-executable instructions further comprise instructions to:

determine, via the at least one processor, that the user interface change event indicates that a rules update is indicated; and obtain, via the at least one processor, an updated version of the dynamic rule data structure from a remote server.

22. A device usage measurement apparatus, comprising:

at least one memory;

at least one processor in communication with the at least one memory, the at least one processor configured to execute processing instructions stored in the at least one memory, in which the at least one processor executes processor-executable instructions to:

detect, via the at least one processor, a user interface change event;

determine, via the at least one processor, an app identifier of an associated third party app;

determine, via the at least one processor, a dynamic rule data structure associated with the app identifier of the associated third party app, in which the dynamic rule data structure is structured to specify a user interface match state and at least one user interface report field;

determine, via the at least one processor, the user interface match state specified by the dynamic rule data structure, in which the user interface match state is structured to specify at least one user interface element of the associated third party app;

determine, via the at least one processor, a current user interface state of the associated third party app by querying an accessibility API, in which the current user interface state is structured to specify data regarding a set of currently displayed user interface elements of the associated third party app;

determine, via the at least one processor, that the user interface match state matches the current user interface state;

determine, via the at least one processor, the at least one user interface report field specified by the dynamic rule data structure, in which the at least one user interface report field is structured to specify a report field user interface match state and at least one report field property to extract;

extract, via the at least one processor, the at least one report field property of the at least one user interface report field by querying the accessibility API to obtain a property value from a report user interface element of the associated third party app matching the report field user interface match state, in which the report field user interface match state is structured to specify either: (1) absolute screen position of the report user interface element or (2) screen position of the report user interface element relative to some other user interface element; and update, via the at least one processor, an active session data structure associated with the dynamic rule data structure to store the extracted property value.

23. The apparatus of embodiment 22, in which the user interface change event is one of: an accessibility event, a timer event, a window event, an input event, a system event.

24. The apparatus of embodiment 22, in which the user interface change event is an accessibility event detected for a specified set of app identifiers of third party apps.

25. The apparatus of embodiment 22, in which the app identifier is one of: a package name, an application bundle identifier, an application name, an executable file name, a process name, a window title, a uniform resource identifier.

26. The apparatus of embodiment 22, in which the associated third party app is a foreground app.

27. The apparatus of embodiment 22, in which the dynamic rule data structure is structured to specify the app identifier.

28. The apparatus of embodiment 22, in which the report user interface element of the associated third party app is further specified based on at least one of: identifier, control class, text pattern.

29. The apparatus of embodiment 22, in which the report user interface element of the associated third party app is further specified based on a relative relationship of the report user interface element relative to the other user interface element.

30. The apparatus of embodiment 29, in which the relative relationship is a hierarchical relationship of the report user interface element relative to the other user interface element.

31. The apparatus of embodiment 22, in which the report user interface element of the associated third party app is further specified based on an aspect ratio of the report user interface element.

32. The apparatus of embodiment 22, in which the instructions to determine the current user interface state further comprise instructions to retrieve the current user interface state from a cache.

33. The apparatus of embodiment 22, in which the instructions to determine that the user interface match state matches the current user interface state further comprise instructions to ascertain that the set of currently displayed user interface elements of the associated third party app includes the at least one user interface element.

34. The apparatus of embodiment 22, in which the user interface match state is structured to specify absolute screen position of the at least one user interface element.

35. The apparatus of embodiment 22, in which the user interface match state is structured to specify screen position of the at least one user interface element relative to some other user interface element.

36. The apparatus of embodiment 22, in which the active session data structure is newly created and populated with a session start time corresponding to the detected user interface change event.

37. The apparatus of embodiment 22, in which the active session data structure is an existing data structure populated with a session start time corresponding to a previously detected user interface change event.

38. The apparatus of embodiment 22, in which the processor-executable instructions further comprise instructions to:

detect, via the at least one processor, a subsequent user interface change event;

determine, via the at least one processor, that the user interface match state does not match a subsequent user interface state of the associated third party app; and transform, via the at least one processor, the active session data structure to ended state, in which the active session data structure is transformed into an ended session data structure that is stored separately from active session data structures.

39. The apparatus of embodiment 38, in which the processor-executable instructions further comprise instructions to send the ended session data structure to a remote server in accordance with a specified schedule.

40. The apparatus of embodiment 22, in which the processor-executable instructions further comprise instructions to:

determine, via the at least one processor, that the user interface change event indicates that a rules update is indicated; and obtain, via the at least one processor, an updated version of the dynamic rule data structure from a remote server.

101. A device usage measurement processor-readable non-transitory physical medium storing processor-executable instructions to:
- detect, via at least one processor, a user interface change event;
- determine, via the at least one processor, an app identifier of an associated third party app;
- determine, via the at least one processor, a dynamic rule data structure associated with the app identifier of the associated third party app, in which the dynamic rule data structure is structured to specify a user interface match state and at least one user interface report field;
- determine, via the at least one processor, the user interface match state specified by the dynamic rule data structure, in which the user interface match state is structured to specify at least one user interface element of the associated third party app based on either: (1) absolute screen position of the at least one user interface element or (2) screen position of the at least one user interface element relative to another user interface element of the associated third party app;
- determine, via the at least one processor, a current user interface state of the associated third party app by querying an accessibility API, in which the current user interface state is structured to specify data regarding a set of currently displayed user interface elements of the associated third party app;
- determine, via the at least one processor, that the user interface match state matches the current user interface state;
- determine, via the at least one processor, the at least one user interface report field specified by the dynamic rule data structure, in which the at least one user interface report field is structured to specify a report field user interface match state and at least one report field property to extract;
- extract, via the at least one processor, the at least one report field property of the at least one user interface report field by querying the accessibility API to obtain a property value from a report user interface element of the associated third party app matching the report field user interface match state; and
- update, via the at least one processor, an active session data structure associated with the dynamic rule data structure to store the extracted property value.

102. The medium of embodiment 101, in which the user interface change event is one of: an accessibility event, a timer event, a window event, an input event, a system event.

103. The medium of embodiment 101, in which the user interface change event is an accessibility event detected for a specified set of app identifiers of third party apps.

104. The medium of embodiment 101, in which the app identifier is one of: a package name, an application bundle identifier, an application name, an executable file name, a process name, a window title, a uniform resource identifier.

105. The medium of embodiment 101, in which the associated third party app is a foreground app.

106. The medium of embodiment 101, in which the dynamic rule data structure is structured to specify the app identifier.

107. The medium of embodiment 101, in which the at least one user interface element of the associated third party app is further specified based on at least one of: identifier, control class, text pattern.

108. The medium of embodiment 101, in which the at least one user interface element of the associated third party app is further specified based on a relative relationship of the at least one user interface element relative to the other user interface element.

109. The medium of embodiment 108, in which the relative relationship is a hierarchical relationship of the at least one user interface element relative to the other user interface element.

110. The medium of embodiment 101, in which the at least one user interface element of the associated third party app is further specified based on an aspect ratio of the at least one user interface element.

111. The medium of embodiment 101, in which the instructions to determine the current user interface state further comprise instructions to retrieve the current user interface state from a cache.

112. The medium of embodiment 101, in which the instructions to determine that the user interface match state matches the current user interface state further comprise instructions to ascertain that the set of currently displayed user interface elements of the associated third party app includes the at least one user interface element.

113. The medium of embodiment 101, in which the report field user interface match state is structured to specify the report user interface element.

114. The medium of embodiment 101, in which the report field user interface match state is structured to specify either: (1) absolute screen position of the report user interface element or (2) screen position of the report user interface element relative to some other user interface element.

115. The medium of embodiment 101, in which the active session data structure is newly created and populated with a session start time corresponding to the detected user interface change event.

116. The medium of embodiment 101, in which the active session data structure is an existing data structure populated with a session start time corresponding to a previously detected user interface change event.

117. The medium of embodiment 101, in which the processor-executable instructions further comprise instructions to:
- detect, via the at least one processor, a subsequent user interface change event;
- determine, via the at least one processor, that the user interface match state does not match a subsequent user interface state of the associated third party app; and
- transform, via the at least one processor, the active session data structure to ended state, in which the active session data structure is transformed into an ended session data structure that is stored separately from active session data structures.

118. The medium of embodiment 117, in which the processor-executable instructions further comprise instructions to send the ended session data structure to a remote server in accordance with a specified schedule.

119. The medium of embodiment 101, in which the processor-executable instructions further comprise instructions to:
  determine, via the at least one processor, that the user interface change event indicates that a rules update is indicated; and
  obtain, via the at least one processor, an updated version of the dynamic rule data structure from a remote server.
122. A device usage measurement processor-readable non-transitory physical medium storing processor-executable instructions to:
  detect, via at least one processor, a user interface change event;
  determine, via the at least one processor, an app identifier of an associated third party app;
  determine, via the at least one processor, a dynamic rule data structure associated with the app identifier of the associated third party app, in which the dynamic rule data structure is structured to specify a user interface match state and at least one user interface report field;
  determine, via the at least one processor, the user interface match state specified by the dynamic rule data structure, in which the user interface match state is structured to specify at least one user interface element of the associated third party app;
  determine, via the at least one processor, a current user interface state of the associated third party app by querying an accessibility API, in which the current user interface state is structured to specify data regarding a set of currently displayed user interface elements of the associated third party app;
  determine, via the at least one processor, that the user interface match state matches the current user interface state;
  determine, via the at least one processor, the at least one user interface report field specified by the dynamic rule data structure, in which the at least one user interface report field is structured to specify a report field user interface match state and at least one report field property to extract;
  extract, via the at least one processor, the at least one report field property of the at least one user interface report field by querying the accessibility API to obtain a property value from a report user interface element of the associated third party app matching the report field user interface match state, in which the report field user interface match state is structured to specify either: (1) absolute screen position of the report user interface element or (2) screen position of the report user interface element relative to some other user interface element; and
  update, via the at least one processor, an active session data structure associated with the dynamic rule data structure to store the extracted property value.
123. The medium of embodiment 122, in which the user interface change event is one of: an accessibility event, a timer event, a window event, an input event, a system event.
124. The medium of embodiment 122, in which the user interface change event is an accessibility event detected for a specified set of app identifiers of third party apps.
125. The medium of embodiment 122, in which the app identifier is one of: a package name, an application bundle identifier, an application name, an executable file name, a process name, a window title, a uniform resource identifier.
126. The medium of embodiment 122, in which the associated third party app is a foreground app.
127. The medium of embodiment 122, in which the dynamic rule data structure is structured to specify the app identifier.
128. The medium of embodiment 122, in which the report user interface element of the associated third party app is further specified based on at least one of: identifier, control class, text pattern.
129. The medium of embodiment 122, in which the report user interface element of the associated third party app is further specified based on a relative relationship of the report user interface element relative to the other user interface element.
130. The medium of embodiment 129, in which the relative relationship is a hierarchical relationship of the report user interface element relative to the other user interface element.
131. The medium of embodiment 122, in which the report user interface element of the associated third party app is further specified based on an aspect ratio of the report user interface element.
132. The medium of embodiment 122, in which the instructions to determine the current user interface state further comprise instructions to retrieve the current user interface state from a cache.
133. The medium of embodiment 122, in which the instructions to determine that the user interface match state matches the current user interface state further comprise instructions to ascertain that the set of currently displayed user interface elements of the associated third party app includes the at least one user interface element.
134. The medium of embodiment 122, in which the user interface match state is structured to specify absolute screen position of the at least one user interface element.
135. The medium of embodiment 122, in which the user interface match state is structured to specify screen position of the at least one user interface element relative to some other user interface element.
136. The medium of embodiment 122, in which the active session data structure is newly created and populated with a session start time corresponding to the detected user interface change event.
137. The medium of embodiment 122, in which the active session data structure is an existing data structure populated with a session start time corresponding to a previously detected user interface change event.
138. The medium of embodiment 122, in which the processor-executable instructions further comprise instructions to:
  detect, via the at least one processor, a subsequent user interface change event;
  determine, via the at least one processor, that the user interface match state does not match a subsequent user interface state of the associated third party app; and
  transform, via the at least one processor, the active session data structure to ended state, in which the active session data structure is transformed into an ended session data structure that is stored separately from active session data structures.

139. The medium of embodiment 138, in which the processor-executable instructions further comprise instructions to send the ended session data structure to a remote server in accordance with a specified schedule.

140. The medium of embodiment 122, in which the processor-executable instructions further comprise instructions to:
determine, via the at least one processor, that the user interface change event indicates that a rules update is indicated; and
obtain, via the at least one processor, an updated version of the dynamic rule data structure from a remote server.

201. A processor-implemented device usage measurement method comprising executing processor-executable instructions to:
detect, via at least one processor, a user interface change event;
determine, via the at least one processor, an app identifier of an associated third party app;
determine, via the at least one processor, a dynamic rule data structure associated with the app identifier of the associated third party app, in which the dynamic rule data structure is structured to specify a user interface match state and at least one user interface report field;
determine, via the at least one processor, the user interface match state specified by the dynamic rule data structure, in which the user interface match state is structured to specify at least one user interface element of the associated third party app based on either: (1) absolute screen position of the at least one user interface element or (2) screen position of the at least one user interface element relative to another user interface element of the associated third party app;
determine, via the at least one processor, a current user interface state of the associated third party app by querying an accessibility API, in which the current user interface state is structured to specify data regarding a set of currently displayed user interface elements of the associated third party app;
determine, via the at least one processor, that the user interface match state matches the current user interface state;
determine, via the at least one processor, the at least one user interface report field specified by the dynamic rule data structure, in which the at least one user interface report field is structured to specify a report field user interface match state and at least one report field property to extract;
extract, via the at least one processor, the at least one report field property of the at least one user interface report field by querying the accessibility API to obtain a property value from a report user interface element of the associated third party app matching the report field user interface match state; and
update, via the at least one processor, an active session data structure associated with the dynamic rule data structure to store the extracted property value.

202. The method of embodiment 201, in which the user interface change event is one of: an accessibility event, a timer event, a window event, an input event, a system event.

203. The method of embodiment 201, in which the user interface change event is an accessibility event detected for a specified set of app identifiers of third party apps.

204. The method of embodiment 201, in which the app identifier is one of: a package name, an application bundle identifier, an application name, an executable file name, a process name, a window title, a uniform resource identifier.

205. The method of embodiment 201, in which the associated third party app is a foreground app.

206. The method of embodiment 201, in which the dynamic rule data structure is structured to specify the app identifier.

207. The method of embodiment 201, in which the at least one user interface element of the associated third party app is further specified based on at least one of: identifier, control class, text pattern.

208. The method of embodiment 201, in which the at least one user interface element of the associated third party app is further specified based on a relative relationship of the at least one user interface element relative to the other user interface element.

209. The method of embodiment 208, in which the relative relationship is a hierarchical relationship of the at least one user interface element relative to the other user interface element.

210. The method of embodiment 201, in which the at least one user interface element of the associated third party app is further specified based on an aspect ratio of the at least one user interface element.

211. The method of embodiment 201, in which the instructions to determine the current user interface state further comprise instructions to retrieve the current user interface state from a cache.

212. The method of embodiment 201, in which the instructions to determine that the user interface match state matches the current user interface state further comprise instructions to ascertain that the set of currently displayed user interface elements of the associated third party app includes the at least one user interface element.

213. The method of embodiment 201, in which the report field user interface match state is structured to specify the report user interface element.

214. The method of embodiment 201, in which the report field user interface match state is structured to specify either: (1) absolute screen position of the report user interface element or (2) screen position of the report user interface element relative to some other user interface element.

215. The method of embodiment 201, in which the active session data structure is newly created and populated with a session start time corresponding to the detected user interface change event.

216. The method of embodiment 201, in which the active session data structure is an existing data structure populated with a session start time corresponding to a previously detected user interface change event.

217. The method of embodiment 201, in which the processor-executable instructions further comprise instructions to:
detect, via the at least one processor, a subsequent user interface change event;
determine, via the at least one processor, that the user interface match state does not match a subsequent user interface state of the associated third party app; and transform, via the at least one processor, the active session data structure to ended state, in which the active session data structure is transformed into an ended session data structure that is stored separately from active session data structures.

218. The method of embodiment 217, in which the processor-executable instructions further comprise instructions to send the ended session data structure to a remote server in accordance with a specified schedule.

219. The method of embodiment 201, in which the processor-executable instructions further comprise instructions to:
determine, via the at least one processor, that the user interface change event indicates that a rules update is indicated; and
obtain, via the at least one processor, an updated version of the dynamic rule data structure from a remote server.

222. A processor-implemented device usage measurement method comprising executing processor-executable instructions to:
detect, via at least one processor, a user interface change event;
determine, via the at least one processor, an app identifier of an associated third party app;
determine, via the at least one processor, a dynamic rule data structure associated with the app identifier of the associated third party app, in which the dynamic rule data structure is structured to specify a user interface match state and at least one user interface report field;
determine, via the at least one processor, the user interface match state specified by the dynamic rule data structure, in which the user interface match state is structured to specify at least one user interface element of the associated third party app;
determine, via the at least one processor, a current user interface state of the associated third party app by querying an accessibility API, in which the current user interface state is structured to specify data regarding a set of currently displayed user interface elements of the associated third party app;
determine, via the at least one processor, that the user interface match state matches the current user interface state;
determine, via the at least one processor, the at least one user interface report field specified by the dynamic rule data structure, in which the at least one user interface report field is structured to specify a report field user interface match state and at least one report field property to extract;
extract, via the at least one processor, the at least one report field property of the at least one user interface report field by querying the accessibility API to obtain a property value from a report user interface element of the associated third party app matching the report field user interface match state, in which the report field user interface match state is structured to specify either: (1) absolute screen position of the report user interface element or (2) screen position of the report user interface element relative to some other user interface element; and
update, via the at least one processor, an active session data structure associated with the dynamic rule data structure to store the extracted property value.

223. The method of embodiment 222, in which the user interface change event is one of: an accessibility event, a timer event, a window event, an input event, a system event.

224. The method of embodiment 222, in which the user interface change event is an accessibility event detected for a specified set of app identifiers of third party apps.

225. The method of embodiment 222, in which the app identifier is one of: a package name, an application bundle identifier, an application name, an executable file name, a process name, a window title, a uniform resource identifier.

226. The method of embodiment 222, in which the associated third party app is a foreground app.

227. The method of embodiment 222, in which the dynamic rule data structure is structured to specify the app identifier.

228. The method of embodiment 222, in which the report user interface element of the associated third party app is further specified based on at least one of: identifier, control class, text pattern.

229. The method of embodiment 222, in which the report user interface element of the associated third party app is further specified based on a relative relationship of the report user interface element relative to the other user interface element.

230. The method of embodiment 229, in which the relative relationship is a hierarchical relationship of the report user interface element relative to the other user interface element.

231. The method of embodiment 222, in which the report user interface element of the associated third party app is further specified based on an aspect ratio of the report user interface element.

232. The method of embodiment 222, in which the instructions to determine the current user interface state further comprise instructions to retrieve the current user interface state from a cache.

233. The method of embodiment 222, in which the instructions to determine that the user interface match state matches the current user interface state further comprise instructions to ascertain that the set of currently displayed user interface elements of the associated third party app includes the at least one user interface element.

234. The method of embodiment 222, in which the user interface match state is structured to specify absolute screen position of the at least one user interface element.

235. The method of embodiment 222, in which the user interface match state is structured to specify screen position of the at least one user interface element relative to some other user interface element.

236. The method of embodiment 222, in which the active session data structure is newly created and populated with a session start time corresponding to the detected user interface change event.

237. The method of embodiment 222, in which the active session data structure is an existing data structure populated with a session start time corresponding to a previously detected user interface change event.

238. The method of embodiment 222, in which the processor-executable instructions further comprise instructions to:
detect, via the at least one processor, a subsequent user interface change event;

determine, via the at least one processor, that the user interface match state does not match a subsequent user interface state of the associated third party app; and transform, via the at least one processor, the active session data structure to ended state, in which the active session data structure is transformed into an ended session data structure that is stored separately from active session data structures.

239. The method of embodiment 238, in which the processor-executable instructions further comprise instructions to send the ended session data structure to a remote server in accordance with a specified schedule.

240. The method of embodiment 222, in which the processor-executable instructions further comprise instructions to:

determine, via the at least one processor, that the user interface change event indicates that a rules update is indicated; and obtain, via the at least one processor, an updated version of the dynamic rule data structure from a remote server.

THE EMBODIMENTS OF THE DUME

The entirety of this disclosure (including the written description, figures, claims, abstract, appendices, and/or the like) for DEVICE USAGE MEASUREMENT ENGINE APPARATUSES, METHODS, SYSTEMS AND MEDIA shows various embodiments via which the claimed innovations may be practiced. It is to be understood that these embodiments and the features they describe are a representative sample presented to assist in understanding the claimed innovations, and are not exhaustive and/or exclusive. As such, the various embodiments, implementations, examples, and/or the like are deemed non-limiting throughout this disclosure. Furthermore, alternate undescribed embodiments may be available (e.g., equivalent embodiments). Such alternate embodiments have not been discussed in detail to preserve space and/or reduce repetition. That alternate embodiments have not been discussed in detail is not to be considered a disclaimer of such alternate undescribed embodiments, and no inference should be drawn regarding such alternate undescribed embodiments relative to those discussed in detail in this disclosure. It is to be understood that such alternate undescribed embodiments may be utilized without departing from the spirit and/or scope of the disclosure. For example, the organizational, logical, physical, functional, topological, and/or the like structures of various embodiments may differ. In another example, the organizational, logical, physical, functional, topological, and/or the like structures of the DUME coordinator, DUME coordinator elements, DUME data stores, DUME components and their subcomponents, capabilities, applications, and/or the like described in various embodiments throughout this disclosure are not limited to a fixed operating order and/or arrangement, instead, all equivalent operating orders and/or arrangements are contemplated by this disclosure. In yet another example, the DUME coordinator, DUME coordinator elements, DUME data stores, DUME components and their subcomponents, capabilities, applications, and/or the like described in various embodiments throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure. Furthermore, it is to be understood that some of the features described in this disclosure may be mutually contradictory, incompatible, inapplicable, and/or the like, and are not present simultaneously in the same embodiment. Accordingly, the various embodiments, implementations, examples, and/or the like are not to be considered limitations on the disclosure as defined by the claims or limitations on equivalents to the claims.

This disclosure includes innovations not currently claimed. Applicant reserves all rights in such currently unclaimed innovations including the rights to claim such innovations and to file additional provisional applications, nonprovisional applications, continuation applications, continuation-in-part applications, divisional applications, and/or the like. It is to be understood that while some embodiments of the DUME discussed in this disclosure have been directed to measuring digital activity on apps and websites, the innovations described in this disclosure may be readily applied to a wide variety of other fields and/or applications.

The following is claimed:

1. A device usage measurement apparatus, comprising:
   at least one memory;
   at least one processor in communication with the at least one memory, the at least one processor configured to execute processing instructions stored in the at least one memory, in which the at least one processor executes processor-executable instructions to:
   detect, via the at least one processor, a user interface change event;
   determine, via the at least one processor, an app identifier of an associated third party app;
   determine, via the at least one processor, a dynamic rule data structure associated with the app identifier of the associated third party app, in which the dynamic rule data structure is structured to specify a user interface match state and at least one user interface report field;
   determine, via the at least one processor, the user interface match state specified by the dynamic rule data structure, in which the user interface match state is structured to specify at least one user interface element of the associated third party app based on either: (1) absolute screen position of the at least one user interface element or (2) screen position of the at least one user interface element relative to another user interface element of the associated third party app;
   determine, via the at least one processor, a current user interface state of the associated third party app by querying an accessibility API, in which the current user interface state is structured to specify data regarding a set of currently displayed user interface elements of the associated third party app;
   determine, via the at least one processor, that the user interface match state matches the current user interface state;
   determine, via the at least one processor, the at least one user interface report field specified by the dynamic rule data structure, in which the at least one user interface report field is structured to specify a report field user interface match state and at least one report field property to extract;
   extract, via the at least one processor, the at least one report field property of the at least one user interface report field by querying the accessibility API to obtain a property value from a report user interface element of the associated third party app matching the report field user interface match state; and update, via the at least one processor, an active session data structure associated with the dynamic rule data structure to store the extracted property value.

2. The apparatus of claim 1, in which the user interface change event is one of: an accessibility event, a timer event, a window event, an input event, a system event.

3. The apparatus of claim 1, in which the user interface change event is an accessibility event detected for a specified set of app identifiers of third party apps.

4. The apparatus of claim 1, in which the app identifier is one of: a package name, an application bundle identifier, an application name, an executable file name, a process name, a window title, a uniform resource identifier.

5. The apparatus of claim 1, in which the associated third party app is a foreground app.

6. The apparatus of claim 1, in which the dynamic rule data structure is structured to specify the app identifier.

7. The apparatus of claim 1, in which the at least one user interface element of the associated third party app is further specified based on at least one of: identifier, control class, text pattern.

8. The apparatus of claim 1, in which the at least one user interface element of the associated third party app is further specified based on a relative relationship of the at least one user interface element relative to the other user interface element.

9. The apparatus of claim 8, in which the relative relationship is a hierarchical relationship of the at least one user interface element relative to the other user interface element.

10. The apparatus of claim 1, in which the at least one user interface element of the associated third party app is further specified based on an aspect ratio of the at least one user interface element.

11. The apparatus of claim 1, in which the instructions to determine the current user interface state further comprise instructions to retrieve the current user interface state from a cache.

12. The apparatus of claim 1, in which the instructions to determine that the user interface match state matches the current user interface state further comprise instructions to ascertain that the set of currently displayed user interface elements of the associated third party app includes the at least one user interface element.

13. The apparatus of claim 1, in which the report field user interface match state is structured to specify the report user interface element.

14. The apparatus of claim 1, in which the report field user interface match state is structured to specify either: (1) absolute screen position of the report user interface element or (2) screen position of the report user interface element relative to some other user interface element.

15. The apparatus of claim 1, in which the active session data structure is newly created and populated with a session start time corresponding to the detected user interface change event.

16. The apparatus of claim 1, in which the active session data structure is an existing data structure populated with a session start time corresponding to a previously detected user interface change event.

17. The apparatus of claim 1, in which the processor-executable instructions further comprise instructions to:
detect, via the at least one processor, a subsequent user interface change event;

determine, via the at least one processor, that the user interface match state does not match a subsequent user interface state of the associated third party app; and transform, via the at least one processor, the active session data structure to ended state, in which the active session data structure is transformed into an ended session data structure that is stored separately from active session data structures.

18. The apparatus of claim 17, in which the processor-executable instructions further comprise instructions to send the ended session data structure to a remote server in accordance with a specified schedule.

19. The apparatus of claim 1, in which the processor-executable instructions further comprise instructions to:
determine, via the at least one processor, that the user interface change event indicates that a rules update is indicated; and obtain, via the at least one processor, an updated version of the dynamic rule data structure from a remote server.

20. A device usage measurement processor-readable non-transitory physical medium storing processor-executable instructions to:
detect, via at least one processor, a user interface change event;

determine, via the at least one processor, an app identifier of an associated third party app;

determine, via the at least one processor, a dynamic rule data structure associated with the app identifier of the associated third party app, in which the dynamic rule data structure is structured to specify a user interface match state and at least one user interface report field;

determine, via the at least one processor, the user interface match state specified by the dynamic rule data structure, in which the user interface match state is structured to specify at least one user interface element of the associated third party app based on either: (1) absolute screen position of the at least one user interface element or (2) screen position of the at least one user interface element relative to another user interface element of the associated third party app;

determine, via the at least one processor, a current user interface state of the associated third party app by querying an accessibility API, in which the current user interface state is structured to specify data regarding a set of currently displayed user interface elements of the associated third party app;

determine, via the at least one processor, that the user interface match state matches the current user interface state;

determine, via the at least one processor, the at least one user interface report field specified by the dynamic rule data structure, in which the at least one user interface report field is structured to specify a report field user interface match state and at least one report field property to extract;

extract, via the at least one processor, the at least one report field property of the at least one user interface report field by querying the accessibility API to obtain a property value from a report user interface element of the associated third party app matching the report field user interface match state; and update, via the at least one processor, an active session data structure associated with the dynamic rule data structure to store the extracted property value.

21. A method for measuring device usage, performed by a device comprising at least one processor and at least one memory for storage of program instructions, the method comprising:
- detect, via the at least one processor, a user interface change event;
- determine, via the at least one processor, an app identifier of an associated third party app;
- determine, via the at least one processor, a dynamic rule data structure associated with the app identifier of the associated third party app, in which the dynamic rule data structure is structured to specify a user interface match state and at least one user interface report field;
- determine, via the at least one processor, the user interface match state specified by the dynamic rule data structure, in which the user interface match state is structured to specify at least one user interface element of the associated third party app based on either: (1) absolute screen position of the at least one user interface element or (2) screen position of the at least one user interface element relative to another user interface element of the associated third party app;
- determine, via the at least one processor, a current user interface state of the associated third party app by querying an accessibility API, in which the current user interface state is structured to specify data regarding a set of currently displayed user interface elements of the associated third party app;
- determine, via the at least one processor, that the user interface match state matches the current user interface state;
- determine, via the at least one processor, the at least one user interface report field specified by the dynamic rule data structure, in which the at least one user interface report field is structured to specify a report field user interface match state and at least one report field property to extract;
- extract, via the at least one processor, the at least one report field property of the at least one user interface report field by querying the accessibility API to obtain a property value from a report user interface element of the associated third party app matching the report field user interface match state; and
- update, via the at least one processor, an active session data structure associated with the dynamic rule data structure to store the extracted property value.

22. A device usage measurement apparatus, comprising:
at least one memory;
at least one processor in communication with the at least one memory, the at least one processor configured to execute processing instructions stored in the at least one memory, in which the at least one processor executes processor-executable instructions to:
- detect, via the at least one processor, a user interface change event;
- determine, via the at least one processor, an app identifier of an associated third party app;
- determine, via the at least one processor, a dynamic rule data structure associated with the app identifier of the associated third party app, in which the dynamic rule data structure is structured to specify a user interface match state and at least one user interface report field;
- determine, via the at least one processor, the user interface match state specified by the dynamic rule data structure, in which the user interface match state is structured to specify at least one user interface element of the associated third party app; determine, via the at least one processor, a current user interface state of the associated third party app by querying an accessibility API, in which the current user interface state is structured to specify data regarding a set of currently displayed user interface elements of the associated third party app;
- determine, via the at least one processor, that the user interface match state matches the current user interface state;
- determine, via the at least one processor, the at least one user interface report field specified by the dynamic rule data structure, in which the at least one user interface report field is structured to specify a report field user interface match state and at least one report field property to extract;
- extract, via the at least one processor, the at least one report field property of the at least one user interface report field by querying the accessibility API to obtain a property value from a report user interface element of the associated third party app matching the report field user interface match state, in which the report field user interface match state is structured to specify either: (1) absolute screen position of the report user interface element or (2) screen position of the report user interface element relative to some other user interface element; and
- update, via the at least one processor, an active session data structure associated with the dynamic rule data structure to store the extracted property value.

23. The apparatus of claim 22, in which the user interface change event is one of: an accessibility event, a timer event, a window event, an input event, a system event.

24. The apparatus of claim 22, in which the user interface change event is an accessibility event detected for a specified set of app identifiers of third party apps.

25. The apparatus of claim 22, in which the app identifier is one of: a package name, an application bundle identifier, an application name, an executable file name, a process name, a window title, a uniform resource identifier.

26. The apparatus of claim 22, in which the associated third party app is a foreground app.

27. The apparatus of claim 22, in which the dynamic rule data structure is structured to specify the app identifier.

28. The apparatus of claim 22, in which the report user interface element of the associated third party app is further specified based on at least one of: identifier, control class, text pattern.

29. The apparatus of claim 22, in which the report user interface element of the associated third party app is further specified based on a relative relationship of the report user interface element relative to the other user interface element.

30. The apparatus of claim 29, in which the relative relationship is a hierarchical relationship of the report user interface element relative to the other user interface element.

31. The apparatus of claim 22, in which the report user interface element of the associated third party app is further specified based on an aspect ratio of the report user interface element.

32. The apparatus of claim 22, in which the instructions to determine the current user interface state further comprise instructions to retrieve the current user interface state from a cache.

33. The apparatus of claim 22, in which the instructions to determine that the user interface match state matches the current user interface state further comprise instructions to ascertain that the set of currently displayed user interface elements of the associated third party app includes the at least one user interface element.

34. The apparatus of claim 22, in which the user interface match state is structured to specify absolute screen position of the at least one user interface element.

35. The apparatus of claim 22, in which the user interface match state is structured to specify screen position of the at least one user interface element relative to some other user interface element.

36. The apparatus of claim 22, in which the active session data structure is newly created and populated with a session start time corresponding to the detected user interface change event.

37. The apparatus of claim 22, in which the active session data structure is an existing data structure populated with a session start time corresponding to a previously detected user interface change event.

38. The apparatus of claim 22, in which the processor-executable instructions further comprise instructions to:
  detect, via the at least one processor, a subsequent user interface change event;
  determine, via the at least one processor, that the user interface match state does not match a subsequent user interface state of the associated third party app; and
  transform, via the at least one processor, the active session data structure to ended state, in which the active session data structure is transformed into an ended session data structure that is stored separately from active session data structures.

39. The apparatus of claim 38, in which the processor-executable instructions further comprise instructions to send the ended session data structure to a remote server in accordance with a specified schedule.

40. The apparatus of claim 22, in which the processor-executable instructions further comprise instructions to:
  determine, via the at least one processor, that the user interface change event indicates that a rules update is indicated; and
  obtain, via the at least one processor, an updated version of the dynamic rule data structure from a remote server.

41. A device usage measurement processor-readable non-transitory physical medium storing processor-executable instructions to:
  detect, via at least one processor, a user interface change event;
  determine, via the at least one processor, an app identifier of an associated third party app;
  determine, via the at least one processor, a dynamic rule data structure associated with the app identifier of the associated third party app, in which the dynamic rule data structure is structured to specify a user interface match state and at least one user interface report field;
  determine, via the at least one processor, the user interface match state specified by the dynamic rule data structure, in which the user interface match state is structured to specify at least one user interface element of the associated third party app;
  determine, via the at least one processor, a current user interface state of the associated third party app by querying an accessibility API, in which the current user interface state is structured to specify data regarding a set of currently displayed user interface elements of the associated third party app;
  determine, via the at least one processor, that the user interface match state matches the current user interface state;
  determine, via the at least one processor, the at least one user interface report field specified by the dynamic rule data structure, in which the at least one user interface report field is structured to specify a report field user interface match state and at least one report field property to extract;
  extract, via the at least one processor, the at least one report field property of the at least one user interface report field by querying the accessibility API to obtain a property value from a report user interface element of the associated third party app matching the report field user interface match state, in which the report field user interface match state is structured to specify either: (1) absolute screen position of the report user interface element or (2) screen position of the report user interface element relative to some other user interface element; and
  update, via the at least one processor, an active session data structure associated with the dynamic rule data structure to store the extracted property value.

42. A method for measuring device usage, performed by a device comprising at least one processor and at least one memory for storage of program instructions, the method comprising:
  detect, via the at least one processor, a user interface change event;
  determine, via the at least one processor, an app identifier of an associated third party app;
  determine, via the at least one processor, a dynamic rule data structure associated with the app identifier of the associated third party app, in which the dynamic rule data structure is structured to specify a user interface match state and at least one user interface report field;
  determine, via the at least one processor, the user interface match state specified by the dynamic rule data structure, in which the user interface match state is structured to specify at least one user interface element of the associated third party app;
  determine, via the at least one processor, a current user interface state of the associated third party app by querying an accessibility API, in which the current user interface state is structured to specify data regarding a set of currently displayed user interface elements of the associated third party app;
  determine, via the at least one processor, that the user interface match state matches the current user interface state;
  determine, via the at least one processor, the at least one user interface report field specified by the dynamic rule data structure, in which the at least one user interface report field is structured to specify a report field user interface match state and at least one report field property to extract;
  extract, via the at least one processor, the at least one report field property of the at least one user interface report field by querying the accessibility API to obtain a property value from a report user interface element of the associated third party app matching the report field user interface match state, in which the report field user interface match state is structured to specify either: (1) absolute screen position of the report user interface element or (2) screen position of the report user interface element relative to some other user interface element; and update, via the at least one processor, an active session data structure associated with the dynamic rule data structure to store the extracted property value.

\* \* \* \* \*